US011816013B2

(12) United States Patent
Hamdi

(10) Patent No.: US 11,816,013 B2
(45) Date of Patent: Nov. 14, 2023

(54) SYSTEMS AND METHODS FOR GENERATING DYNAMIC 3D MODELS OF COMPUTER SYSTEMS

(71) Applicant: Acentium Inc, Boston, MA (US)

(72) Inventor: Amine Hamdi, Boston, MA (US)

(73) Assignee: Acentium Inc, Boston, MA (US)

( * ) Notice: Subject to any disclaimer, the term of this patent is extended or adjusted under 35 U.S.C. 154(b) by 317 days.

(21) Appl. No.: 17/150,627

(22) Filed: Jan. 15, 2021

(65) Prior Publication Data

US 2021/0240591 A1 Aug. 5, 2021

Related U.S. Application Data

(60) Provisional application No. 62/962,639, filed on Jan. 17, 2020.

(51) Int. Cl.
*G06F 11/34* (2006.01)
*G06F 11/32* (2006.01)
(Continued)

(52) U.S. Cl.
CPC ...... *G06F 11/3433* (2013.01); *G06F 11/0781* (2013.01); *G06F 11/321* (2013.01);
(Continued)

(58) Field of Classification Search
CPC ............. G06F 11/3433; G06F 11/0781; G06F 11/321; G06F 11/3466; G06T 15/005;
(Continued)

(56) References Cited

U.S. PATENT DOCUMENTS

| 7,480,866 B2 | 1/2009 | Germain et al. |
| 2004/0061701 A1 | 4/2004 | Arquie et al. |

(Continued)

FOREIGN PATENT DOCUMENTS

| EP | 3 151 468 A1 | 4/2017 |
| WO | WO-2017/024058 A1 | 2/2017 |

OTHER PUBLICATIONS

International Preliminary Report on Patentability on PCT Appl. Ser. No. PCT/US2021/013714 dated Jul. 28, 2022 (8 pages).
(Continued)

*Primary Examiner* — Michelle Chin
(74) *Attorney, Agent, or Firm* — Foley & Lardner LLP

(57) ABSTRACT

Systems and methods for generating and rendering dynamic 3D representations of subsystems of a computer ecosystem can include a computing device receiving data indicative of importance parameters of a subset of assets of a plurality of assets of a computer environment. Each asset of the subset of assets can be associated with a respective importance parameter. The computing device can determine, for each asset of the subset of assets, a respective visual depth using the respective importance parameter of the asset. The computing device can construct a visual representation of a 3D model of the subset of assets. Each asset can be depicted according to the respective visual depth in the visual representation of the 3D model. The computing device can include causing display of the visual representation of the 3D model on a display device.

20 Claims, 20 Drawing Sheets

(51) Int. Cl.
  *G06F 11/07* (2006.01)
  *G06T 15/00* (2011.01)
  *G06T 17/00* (2006.01)
  *G06T 19/00* (2011.01)

(52) U.S. Cl.
  CPC ........ *G06F 11/3466* (2013.01); *G06T 15/005* (2013.01); *G06T 17/00* (2013.01); *G06T 19/00* (2013.01); *G06T 2200/04* (2013.01); *G06T 2200/08* (2013.01)

(58) Field of Classification Search
  CPC ..... G06T 17/00; G06T 19/00; G06T 2200/04; G06T 2200/08
  See application file for complete search history.

(56) References Cited

U.S. PATENT DOCUMENTS

| | | | |
|---|---|---|---|
| 2008/0250356 | A1 | 10/2008 | Johns |
| 2017/0278004 | A1* | 9/2017 | McElhinney ............ G06N 5/04 |
| 2017/0374092 | A1 | 12/2017 | Carter |
| 2019/0087990 | A1* | 3/2019 | Hournbuckle, Jr. ......................... G06F 3/04817 |

OTHER PUBLICATIONS

International Search Report and the Written Opinion on PCT Appl. Ser. No. PCT/US2021/013714 dated May 6, 2021 (12 pages).
EP Office Action on EP Appl. Ser. No. 21705016.0 dated Jul. 11, 2023 (7 pages).

* cited by examiner

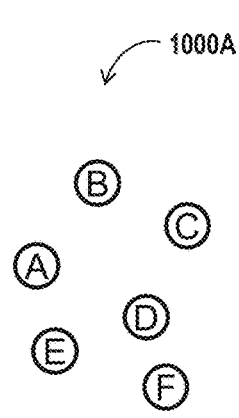 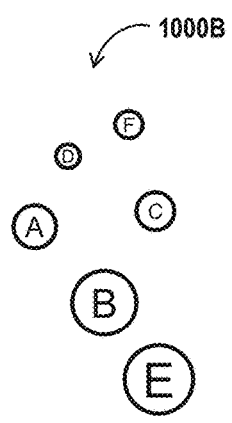 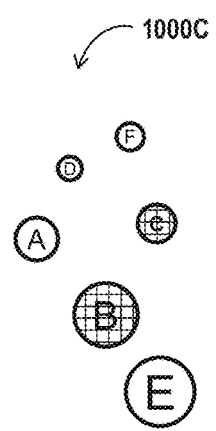
*Fig. 10A*  *Fig. 10B*  *Fig. 10C*

SYSTEMS AND METHODS FOR GENERATING DYNAMIC 3D MODELS OF COMPUTER SYSTEMS

This application claims priority to, and the benefit of, U.S. Provisional Application No. 62/962,639 filed on Jan. 17, 2020, and entitled "SYSTEMS AND METHODS FOR GENERATING DYNAMIC 3D MODELS OF COMPUTER SYSTEMS," which is incorporated herein by reference in its entirety.

FIELD OF THE DISCLOSURE

The present application relates generally to systems and methods for generating and rendering dynamic three-dimensional (3D) models of computer systems. Specifically, the present application relates to generating and rendering in real time dynamic 3D models of computer systems, solution stacks, computer subsystems, or groups of assets in a computer environment, among others.

SUMMARY OF THE DISCLOSURE

According to at least one aspect, a system can include one or more processors and a memory configured to cause the system to receive data indicative of importance parameters of a subset of assets of a plurality of assets of a computer environment. Each asset of the subset of assets can be associated with a respective importance parameter. The system can determine, for each asset of the subset of assets, a respective visual depth using the respective importance parameter of the asset. The system can construct a visual representation of a three-dimensional (3D) model of the subset of assets. Each asset can be depicted according to the respective visual depth in the visual representation of the 3D model. The system can include causing display of the visual representation of the 3D model on a display device.

According to at least one aspect, a method can include a computing device receiving data indicative of importance parameters of a subset of assets of a plurality of assets of a computer environment. Each asset of the subset of assets can be associated with a respective importance parameter. The computing device can determine, for each asset of the subset of assets, a respective visual depth using the respective importance parameter of the asset. The computing device can construct a visual representation of a three-dimensional (3D) model of the subset of assets. Each asset can be depicted according to the respective visual depth in the visual representation of the 3D model. The computing device can include causing display of the visual representation of the 3D model on a display device.

According to at least one aspect, a computer-readable medium can include computer code instructions stored thereon. The computer code instructions when executed by one or more processors cause the one or more processors to receive data indicative of importance parameters of a subset of assets of a plurality of assets of a computer environment. Each asset of the subset of assets can be associated with a respective importance parameter. The one or more processors can determine, for each asset of the subset of assets, a respective visual depth using the respective importance parameter of the asset. The one or more processors can construct a visual representation of a three-dimensional (3D) model of the subset of assets. Each asset can be depicted according to the respective visual depth in the visual representation of the 3D model. The one or more processors can include causing display of the visual representation of the 3D model on a display device.

BRIEF DESCRIPTION OF THE DRAWINGS

FIGS. 10A-10F show various 3D visual representations of a cluster of assets, according to example embodiments.

DETAILED DESCRIPTION

For purposes of reading the description of the various embodiments below, the following descriptions of the sections of the specification and their respective contents may be helpful:

Section A describes a computing and network environment which may be useful for practicing embodiments described herein.

Section B describes monitoring solution stacks or subsystems of a computer ecosystem.

Section C describes generating and rendering dynamic 3D representations of subsystems of a computer ecosystem.

A. Computing and Network Environment

Figure 1A:
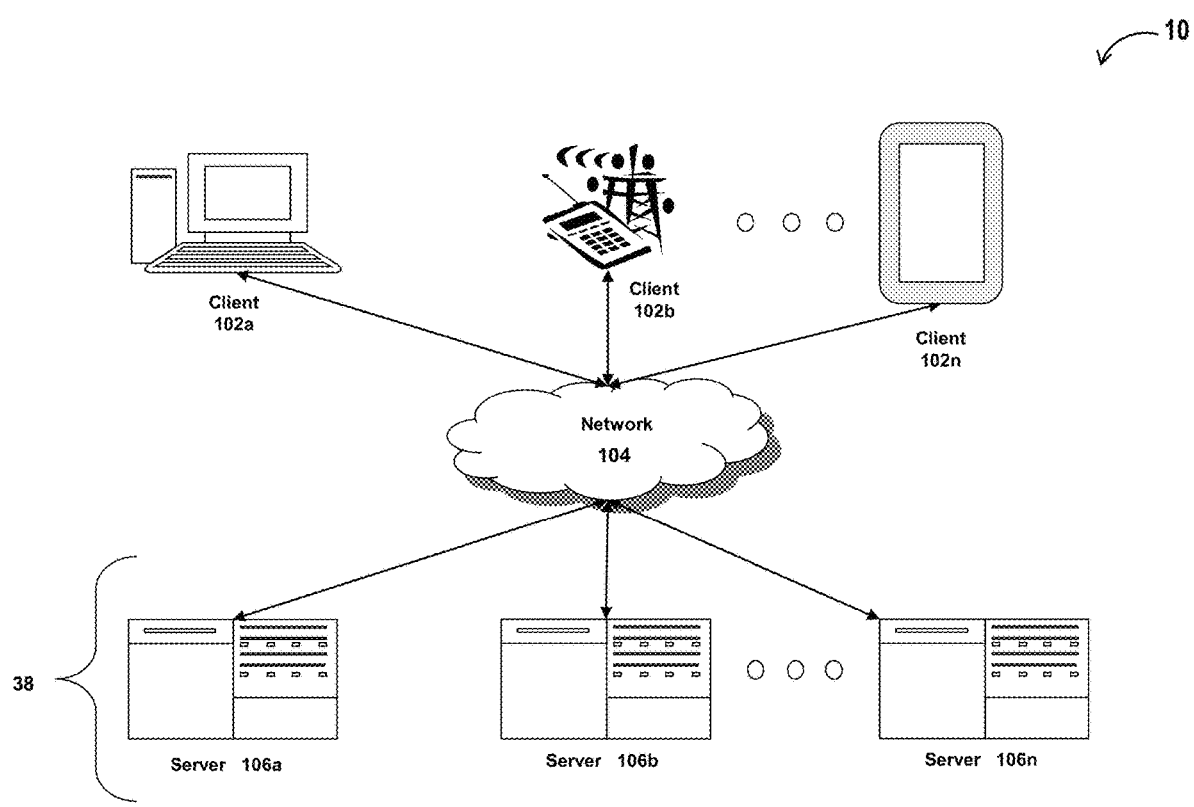
FIG. 1A is a block diagram depicting an embodiment of a computing and network environment.

In addition to discussing specific embodiments of the present solution, it may be helpful to describe aspects of the operating environment as well as associated system components (e.g., hardware elements) in connection with the methods and systems described herein. Referring to FIG. 1A, an embodiment of a computing and network environment 10 is depicted. In brief overview, the computing and network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 1G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the computing and network environment 10 may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS 8 or 10, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, firewall, Internet of Things (IoT) controller. In one embodiment, the server 106 may be referred to as a remote machine or a node. In another embodiment, a plurality of nodes 290 may be in the path between any two communicating servers.

Figure 1B:
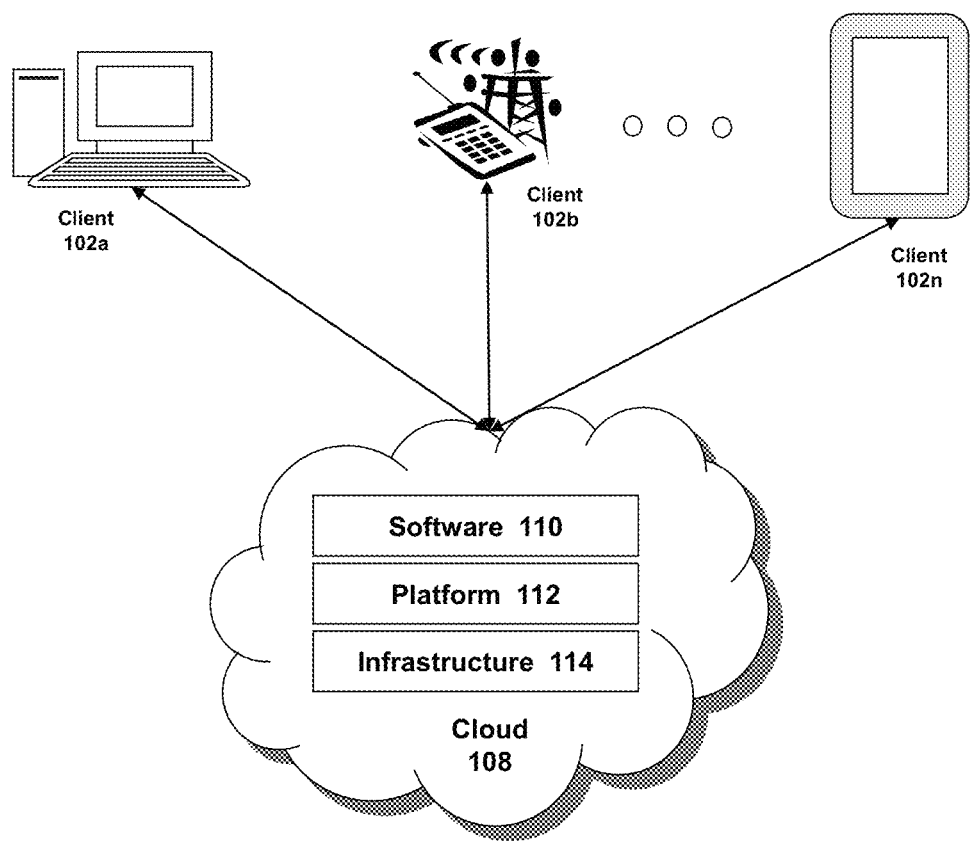
FIGS. 1B-1D are block diagrams depicting embodiments of computers useful in connection with the methods and systems described herein.

Referring to FIG. 1B, a cloud computing environment is depicted. The cloud computing environment can be part of the computing and network environment 10. A cloud computing environment may provide client 102 with one or more resources provided by the computing and network environment 10. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 102 may also access SaaS resources through smartphone or tablet applications, including, for example, Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
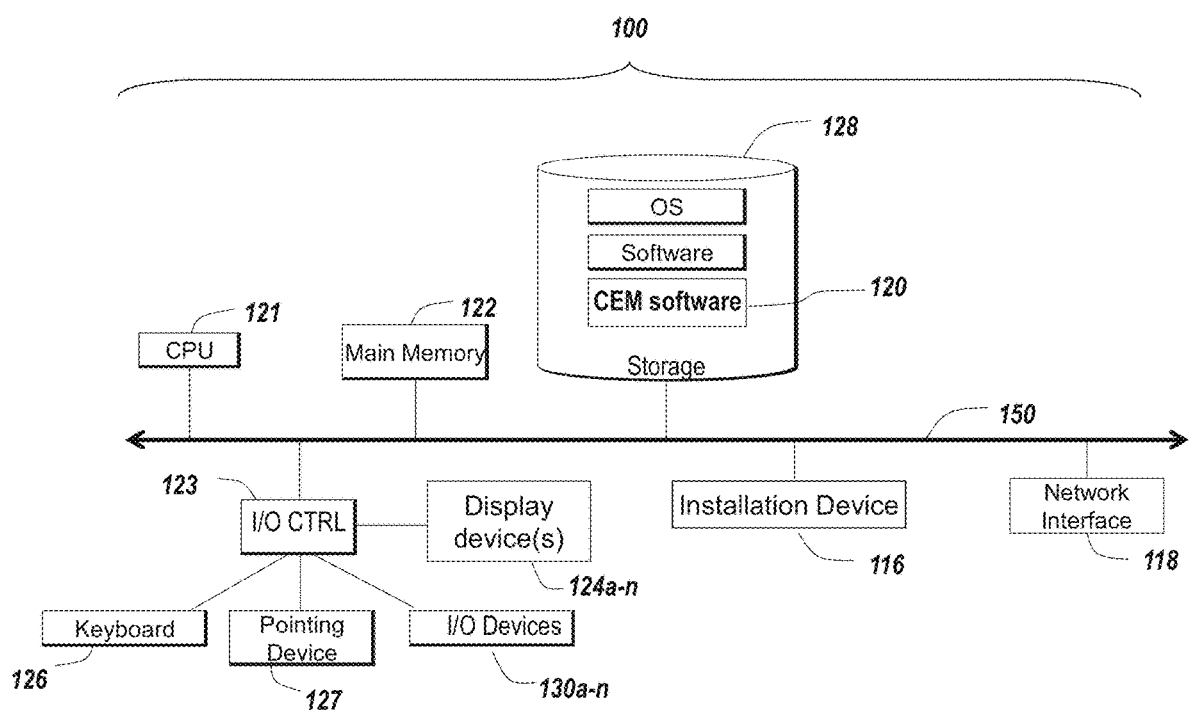
Figure 1D:
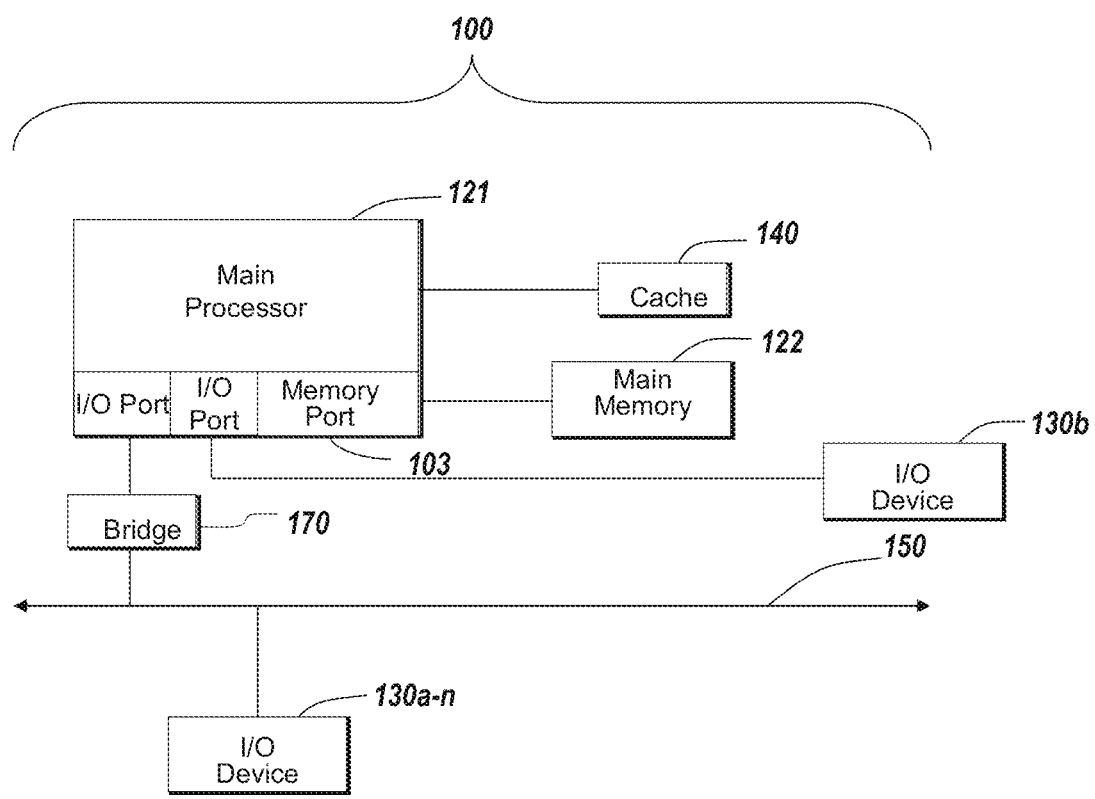

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, a computer environment monitoring (CEM) software 120, and/or other software, among others. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferro-electric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the CEM software 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is a eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, central processing unit (CPU) and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Monitoring Solution Stacks or Subsystems of a Computer Ecosystem

The present disclosure relates to systems and methods for monitoring solution stacks, computer subsystems or assets thereof in a computer environment, such as the computing and network environment 10. Specifically, the current disclosure relates to intelligent generating and rendering of monitoring data of the computer environment, a solution stack, a computer subsystem or assets thereof. A computer environment is also referred to herein as a computer ecosystem. A solution stack as used herein can refer to a bundle of software components and/or hardware subsystems or devices associated with a corresponding solution, also referred to in some implementations as information technology (IT) solution. As used herein, an asset of the computer environment can be a software asset, a hardware asset, a data asset, a user or individual associated with the computer environment or a solution thereof, or a combination thereof. A software asset can include, for example, a software subsystem, a software server, a software code, a software component, or a script, among others. A hardware asset can include a hardware server, a client computing device, a storage device, a network device, a power device or system, a microprocessor, a microchip, a printed circuit board, a controller, a circuitry, a sensor, a camera, or other electric, electronic or electromechanical device, among others. A data asset can include a database, a data folder, a data file, a data structure or a combination thereof.

A solution can refer to a function to be performed, for example, within the computer environment/ecosystem. The solution can be a software solution, e.g., a function performed through software executing on one or more computing devices, a hardware-based solution or a combination thereof. In general, a solution stack can be viewed as the set of assets configured to provide a reliable and fully functioning corresponding solution. For instance, the solution stack can form a complete system or platform to provide the reliable and fully functioning corresponding solution. Solution stacks and corresponding solutions may be used, or referred to, herein interchangeably. Illustrative examples of solutions can include an enterprise email service such as MICROSOFT EXCHANGE, an instant messaging and/or a voice-over-IP (VOIP) service such as SKYPE for Business, a teleconferencing service, a document management service, a computerized accounting service, an electric power solution, for example, for a given enterprise office or site, a storage solution, a virtualization solution, a network solution, or a combination thereof, among others.

The software bundle for a corresponding solution can be sold as a single software package. A vendor may either sell only the software package or sell both the software package and the corresponding supporting and/or hosting hardware for a given solution. However, even when selling only the software package, the vendor may still provide specifications of the hardware infrastructure, such as the type and number of hardware assets, and/or the corresponding architecture (e.g., how the hardware assets are interconnected) specified or preferred to run and support the software bundle. The vendor may provide specified or preferred configuration settings or other settings for various assets of the solution stack, including hardware and/or software assets, or for the solution stack as a whole.

When a solution stack for a corresponding solution is built or integrated, for example, within a computer environment such as an enterprise computer network, the integration or building of the solution stack may not conform with specifications or requirements provided by the corresponding vendor. For example, the owner of the computer environment or the respective IT personnel may use a different hardware infrastructure, (e.g., in terms of the number, types or capabilities of computer servers or other devices used), different architecture (e.g., in terms of inter-connections between various assets) and/or different settings (e.g., configuration settings) than those specified or recommended by the vendor. Also, even if the solution stack is initially built, installed or integrated in compliance with the vendor's specifications or recommendations, intentional or inadvertent modifications of the solution stack may occur after the installation or deployment of the solution stack. For example, an IT administrator may intentionally or inadvertently add, remove or omit an asset of the solution stack, add, remove omit a physical or logical connection between two or more assets in the solution stack, or change a configuration setting or other setting for one or more assets of the solution stack, among others. Also, an asset or a subsystem (e.g., a firewall or a cybersecurity system among others) of the computer environment may automatically affect similar changes to the solution stack, for example, by quarantining an asset or modifying a setting parameter of an asset.

Changes or modifications to the solution stack made prior to, during or after deployment of the solution stack can negatively affect or jeopardize the functioning, performance, security, compliance, risk, and/or operational health, among others, of the corresponding solution. The changes or modifications to the solution stack can negatively affect or jeopardize the functioning, performance, security, compliance, risk, and/or operational health, among others, of another solution, another subsystem or another asset of the computer environment, or of the whole computer environment. For example, if the vendor specifications recommend or suggest hosting backend and frontend databases of a solution on separate servers, deploying or modifying the solution stack to host such databases on the same server can lead to a cybersecurity risk that can jeopardizing the security, availability and/or credibility of data stored in the backend database. For example, an intrusion of the server can expose both the frontend and backend databases. Also, reducing, e.g., at the deployment phase or after deployment of the solution stack, the number of servers recommended for the solution can cause performance, operational, compliance and/or security issues associated with the solution stack or other components of the computer environment. For instance, using a smaller number of servers (e.g., smaller than a number of servers specified by the vendor) can result in higher than planned processing load on the deployed servers or in mitigated or nullified redundancy. Overloading the deployed servers can reduce the respective processing speed and/or increase the number or rate of dropped tasks, while mitigating or nullifying redundancy can increase the likelihood of total failure of the solution. As another example, deployments of, or modifications to, a solution stack that violate a requirement or specification of not assigning a separate externally facing Internet Protocol (IP) address and a separate internally facing IP address to the same server can result in creating a cybersecurity hole, which can result in a backdoor that facilitates bypassing a firewall of the computer environment or other cybersecurity system. Such violation can occur, for example, in a deployed Skype™ edge server. Another example problem may occur when a firewall configuration wrongly indicates that a server, or asset, of the solution is meant or intended to communicate internally. In such example, the firewall can block, lock down or quarantine the server (or asset) and prevent it from communicating with an external entity (e.g., outside the computer environment), which can bring the whole solution or one or more functions thereof down.

The changes or modifications to any solution stack can occur at any point of time during or after deployment. As such, monitoring deployed solution stacks can help diagnose and overcome, or quickly address, technical problems or risks associated with inadequate builds or configurations, e.g., compared to reference solution profiles or specifications, of the solution stack or related assets. Specifically, monitoring a current state of a given solution stack can allow for detecting and addressing functional, performance, operational, compliance or security problems associated with the solution stack. The current state of the solution stack can include information indicative of the assets forming the solution stack, the configuration settings of the assets, the infrastructure interconnections between the assets, and/or the security-wise inter-relations between the assets, among others, at a current point of time. A CEM system can compare the current state to a reference or desired state of the solution stack to allow for correcting, or eliminating, any discrepancies between both states whenever desired, for example, to avoid or address any problems related to such discrepancies. In general, the CEM system can monitor a computer ecosystem or respective solution stacks, subsystems and/or assets.

The CEM system can include, for example, the CEM software 120 and one or more computing devices for executing the CEM software 120. The one or more computing devices can be part of, or communicatively connected to, the computer ecosystem or subsystems or solutions thereof. Upon detecting an architectural, configuration, operational, security or compliance problem (e.g., a solution stack is hosting frontend and backend databases on the same server) associated with a solution stack, subsystem or asset, the CEM system can alert one or more users, e.g., system administrators. When made aware of such problem, a system administrator can take proper steps to fix an inadequate build, deployment or configuration or fix a security or compliance issue.

Real time or near real-time (e.g., iteratively every few minutes) monitoring of the assets, architecture, and/or configuration of a deployed solution sack or subsystem can allow for continuous assessment of the performance health, the security health and/or the compliance to relevant regulations, among other aspects of the solution or the subsystem. The performance health can be defined, for example, based on usage or availability of processing resources, memory or storage resources, network resources or power resources, among other resources. The security health can be defined based on, or can be indicative of, vulnerabilities, security holes, or security risks, among others issues. The compliance of the solution stack can include compliance to business or legal regulations and/or rules, among others. Also, monitoring of the performance health, the security health and/or the compliance to relevant regulations and/or rules can help identify any effects the deployed solution stack or subsystem may have on other solution stacks, other subsystems or other assets of the computer environment. In many practical cases, monitoring separate solutions stacks, separate subsystems or relatively more important (e.g., from a business perspective or risk perspective) solution stacks or subsystems can be more efficient, more reliable and more productive than monitoring the whole computer environment. Also, monitoring separate solutions stacks or subsystems can allow for relatively quick and efficient responses to cybersecurity threats or attacks or other problems, for example, compared to monitoring the whole computer environment.

Figure 2:
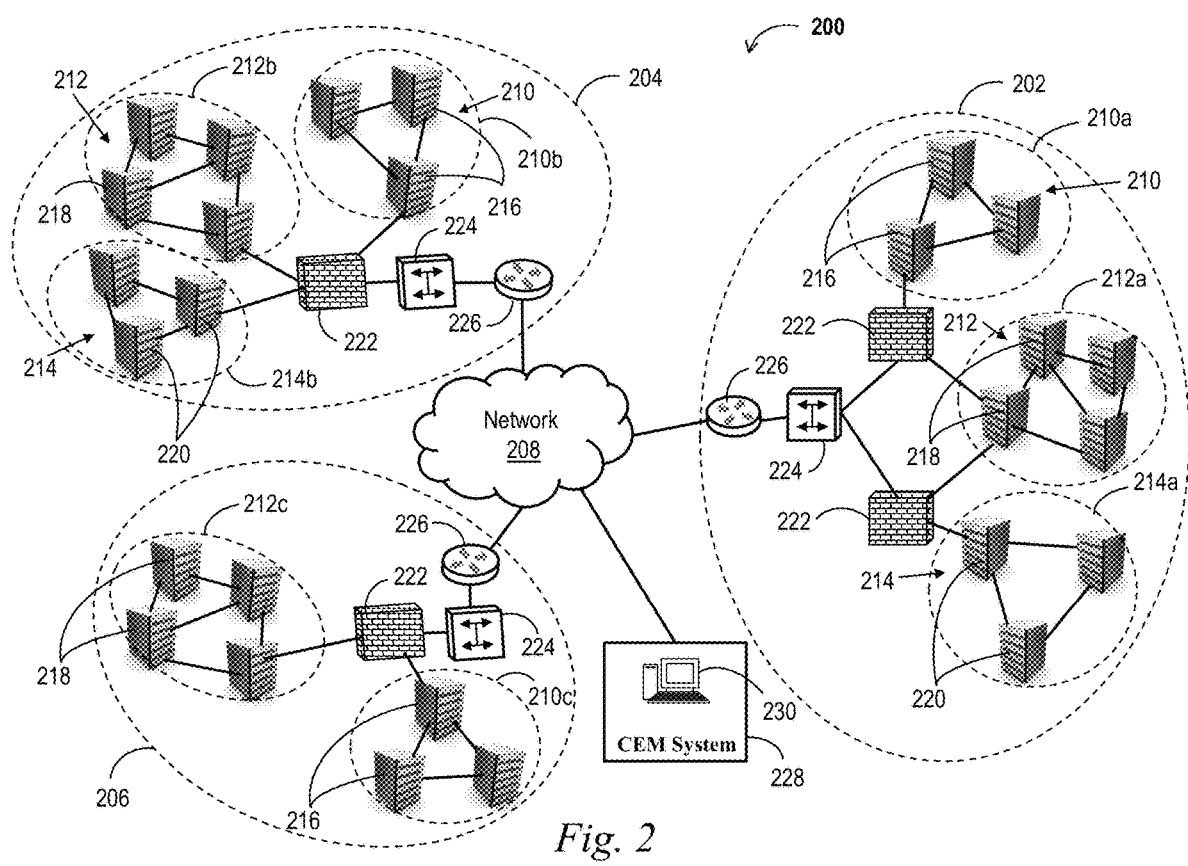
FIG. 2 is a block diagram illustrating an example computer environment hosting a plurality of solutions or subsystems.

Referring to FIG. 2, an example computer environment 200 hosting a plurality of IT solutions is depicted. The computer environment 200 can be, or can include, an enterprise or corporate computer network, a communication network, a power grid system, a network of remotely monitored or controlled medical devices, or a combination thereof, among others. The communication network can include a cellular network, landline network, optical network, metropolitan area network (MAN), or wide area network (WAN), among other networks. The computer environment 200 can be distributed over, or can include, a plurality of sites 202-206, for example, associated with distinct geolocations. The sites 202, 204 and 206 can be communicatively coupled or connected to each other through a communication network 208. The communications network 208 can include a local-area network (LAN), e.g. Intranet, a metropolitan area network (MAN), a wide area network (WAN), a wireless network, a private network, a public network, the Internet, or a combination thereof. A site, e.g., 202, 204 or 206, can include or can be a local computer sub-environment or network associated, for example, with a corporate office or industrial factory or site. A site, e.g., 202, 204 or 206, can be associated with a data center, for example, hosting a portion of the computer environment deployed in the cloud.

The computer environment 200 can include a plurality of solution stacks 210, 212 and 214 integrated or deployed therein. Each solution stack can be associated with, e.g., configured to provide, a corresponding solution. Each of the solution stacks 210, 212 and 214 can be distributed over one or more of the sites 202, 204 and 206. For example, solution stack 210 can include sub-stacks 210a, 210b and 210c arranged at sites 202, 204 and 206, respectively. Solution stack 212 can include sub-stacks 212a, 212b and 212c arranged at sites 202, 204 and 206, respectively. Solution stack 214 can include sub-stacks 214a and 214b arranged at sites 202 and 204, respectively. For any of the solution stacks 210, 212 or 214, each of (or at least one of) the corresponding sub-stacks can represent a full solution stack. For example, the corresponding sub-stacks can be clones or copies of each other. In some implementations, the sub-stacks for any of the solution stacks 210, 212 or 214 can form a full solution stack in combination. Each solution stack 210, 212 or 214 can include a corresponding plurality of assets. For example, solution stack 210 can include a plurality of assets 216, solution stack 212 can include a plurality of assets 218, and solution stack 214 can include a plurality of assets 220. For each solution stack 210, 212 or 214, the corresponding assets can include hardware assets, software assets or a combination of both.

Each of the sites 202, 204 and 206 can include one or more firewalls 222, one or more switches 224, one or more routers 226, other computer or electronic devices (not shown in FIG. 2), or a combination thereof. The other computer or electronic devices may or may not be part of solution stacks 210, 212 and 214. Any of the solution stacks 210, 212 and 214, or an asset thereof, can be communicatively coupled to the one or more firewalls 222, the one or more switches 224 and/or the one or more routers 226. For example, at each site 202, 204 or 206 the corresponding firewall(s) 222 can monitor and control communications between a solution sub-stack in that site with other solution sub-stacks, other computer sub-systems and/or other assets in that site. The firewall 222 at a given site 202, 204 or 206 can monitor and control communications with entities outside the site. In some implementations, the firewall 22, the switches 224 and/or the routers 226 can be part of the solution stacks 210, 212 and/or 214.

Distinct solution stacks or distinct solution sub-stacks, e.g., associated with distinct solutions, may share one or more assets. For example, a firewall 222 can be part of two distinct solution stacks or distinct solution sub-stacks. While FIG. 2 provides an example illustration of solution stacks, e.g., solution stacks 210, 212 and 214, integrated in a computer environment 200, such illustration is not limiting, for example, with respect to the number of solution stacks in computer environment 200, the distribution of a solution stack among one or more sites, the number of assets in each solution stack, the interconnection between assets within a given solution stack, the connections between any solution stack and other assets of the computer environment 200, among others.

A solution, or a corresponding solution stack, can include one or more assets, one or more sub-solutions, or a combination thereof. A sub-solution can be viewed as a relatively small solution embedded within another larger solution. A sub-solution can include corresponding assets, but may not include other solutions or sub-solutions. A solution can include assets, sub-solutions, other solutions or a combination thereof. For example, one or more domain controllers can form a sub-solution for handling security authentication requests. SKYPE for Business is an example of a solution that includes a security authentication sub-solution, e.g., one or more domain controllers, and one or more other assets.

A super solution can include a plurality of solutions. In some implementations, a super solution can be a group of solutions. Two or more solutions of the group of solutions can share one or more assets. An example of a super solution can be a unified communication system including the solutions SKYPE for Business, MICROSOFT EXCHANGE, and a teleconferencing system can be viewed as a super solution. A super solution can be monitored or assessed as one entity. In some implementations, the computer environment 200 can include one or more super solutions, one or more solutions, one or more sub-solutions or a combination thereof.

The solution stacks 210, 212 and/or 214 can be defined within one layer or level, or across a plurality of layers or levels. For instance, the solution stacks 210, 212 and/or 214 can be defined at the servers' level, at the virtualization layer, at the network layer or level, or at the application layer, among others. For example, a solution that is implemented using virtual machines can be defined in terms of such virtual machines and corresponding virtualization host(s). In some implementations, the solution stacks 210, 212 and/or 214 can be defined across all layers or levels, for example, from the application layer all the way down to the electrical or physical layer. In such implementations, the solution stacks 210, 212 and/or 214 can include a combination of software assets, computing devices, network devices, and power supply devices, among others assets associated with various layers or levels. When considering all layers or levels, the solution stack can be defined as a complete set of software and/or hardware assets involved in performing the corresponding solution or the function(s) associated with the solution.

The computer environment 200 can include, or can be communicatively coupled to, a computer environment monitoring (CEM) system 228. The CEM system 228 can include one or more computing devices 230 for executing the CEM software 120 described with respect to FIG. 1C. The one or more computing devices 230 can be similar to the computing device 100 of FIG. 1C. In some implementations, the one or more computing devices 230 of the CEM system 228, or a subset thereof, can be arranged at one of the sites 202, 204 or 206. The CEM system 228 can include a computing device 230 located at a remote location from all sites 202, 204 and 206. The CEM system 228 can be configured to perform methods described in this disclosure.

The computing device 100 depicted in, and described in with regard to, FIGS. 1C and 1D can represent the architecture of the CEM system 228, devices thereof, or other devices of the computer ecosystem 200. The servers 106 shown in FIG. 1A can represent servers of the computer ecosystem 200. Some of the hardware, software and/or data assets of the computer ecosystem 200 can be located in the cloud 108, as shown in FIG. 1B. The client devices 102 shown in FIGS. 1A and 1B can represent client devices of the computer ecosystem 200 or client devices accessing the computer ecosystem 200. As used herein, a subsystem of the computer ecosystem 200 can include one or more solution stacks, a portion of a solution stack or a subset of the assets (e.g., associated with a geolocation, a manufacturer or vendor, an asset type, or an operating system, among others) of the computer ecosystem 200.

Figure 3:
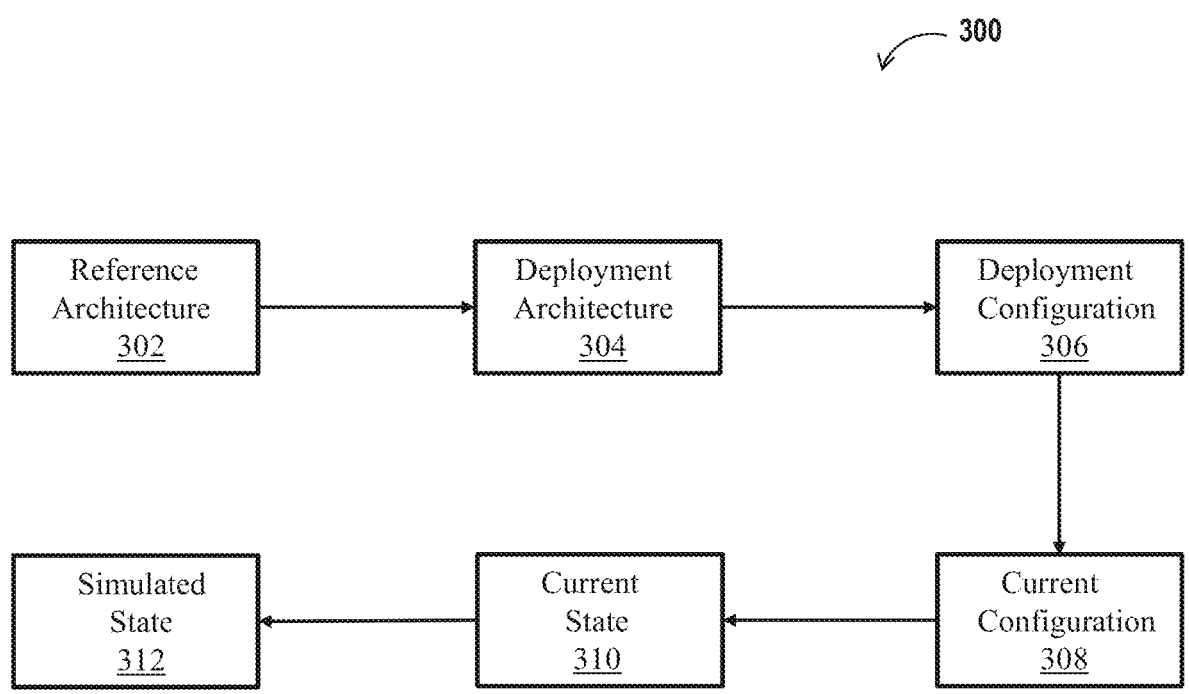
FIG. 3 shows a block diagram illustrating various phases, states or aspects of a solution or subsystem.

Referring to FIG. 3, a block diagram illustrating various phases, states or aspects 300 of a solution or a subsystem is shown. The various phases, states or aspects 300 can include a reference architecture 302, a deployment architecture 304, a deployment configuration 306, a current configuration 308, a current state 310, and/or a simulated state 312. These phases, states or aspects may not be all available for each solution. For instance, only a subset of these phases, states or aspects 300 can be available. The various phases, states or aspects 300 can be associated with distinct stages of a lifecycle of the solution or the respective solution stack.

The reference architecture 302 can represent a recommended or desired architecture, for example, provided or specified by a vendor or an architect of the solution or the subsystem. The reference architecture can specify, for example, the hardware and software assets to form the solution or the subsystem, the interconnections between various assets, the hardware host(s) for each software asset, or a combination thereof. The reference architecture 302 can specify, or can include, one or more configuration settings for one or more assets of the solution stack or subsystem or other assets of the computer environment 200 in which the solution stack or subsystem is to be integrated. The reference architecture 302 may specify one or more requirements or parameters related to, for example, high availability, disaster recovery, business continuity, operational recovery, resiliency, or a combination thereof, among others. Information indicative of, or associated with, the reference architecture 302 can be provided as input to the CEM system 228, or obtained from a database or asset of the computer environment 200.

The deployment architecture 304 can represent an architecture of the solution stack or subsystem as initially deployed or integrated in the computer environment 200. The deployment architecture 304 may or may not be in conformity with the reference architecture 302. For example, as discussed above, the solution or solution stack or subsystem may be deployed with less or more hardware assets, or with assets having different capabilities than those specified in the reference architecture 302. According to another example, the solution stack or subsystem may be deployed with interconnections between various assets, or respective ports, that are different than the interconnections specified in the reference architecture 302. According to yet another example, one or more software assets, e.g., including databases, may be hosted on hardware assets different than those specified in the reference architecture 302. Information indicative of, or associated with, the deployment architecture 304 can be provided as input to the CEM system 228, or can be obtained from a database or asset of the computer environment 200.

The deployment configuration 306 can include, or can be indicative of, configuration settings for one or more assets of the solution stack or subsystem that are adopted at the time when the solution stack or subsystem is initially deployed within the computer environment 200. Similar to the deployment architecture 304, the deployment architecture 306 may not conform with configuration settings specified in the reference architecture 302. Also, the deployment configuration 306 may or may not conform, for example, with security specifications, compliance specifications, or other specifications associated with the solution stack, or the computer environment 200. The security specifications, compliance specification, or other specifications can be listed or described as part of the reference architecture 302 or otherwise provided by a vendor of the solution or through an online resource or database. Discrepancies between deployment configuration 306 and other settings or specifications, e.g., related to the solution stack or the computer environment 200, can occur as a matter of choice or by mistake on the part of the person deploying the solution or corresponding solution stack. The CEM system 228 can obtain information indicative of, or associated with, the deployment configuration 306, for example, from configuration logs associated with the solution stack or assets thereof, from a database or other data source associated with the solution stack or the computer environment 200, or as input data, among others.

The current configuration 308 can include, or can be indicative of, the configuration settings of the solution stack or one or more assets thereof at a current time instant post deployment. After deployment of the solution or solution stack or subsystem, a user or an asset of the computer environment 200, such as firewall 222 or a computer server, among others, can modify the configuration settings adopted at the time of deployment. For example, a system administrator may intentionally or inadvertently modify one or more configuration settings associated with one or more assets of the solution stack. An asset of the computer environment 200 may automatically modify one or more configuration settings associated with one or more other assets of the solution stack or subsystem, for example, due to conflict with other configuration settings, such as security or compliance settings, associated with the computer environment 200. The CEM system 228 can obtain information indicative of, or associated with, the current configuration 308, for example, from one or more assets of the solution stack, or configuration logs associated with the solution stack or the computer environment 200, among others.

The current state 310 can represent a current situation of the solution or subsystem from one or more perspectives. For instance, the current state 310 can include information related to, or indicative of, a current architecture of the solution stack or subsystem. The current architecture can include assets currently forming the solution stack or subsystem and corresponding interconnections. The current architecture may be similar to, or different from the deployment architecture 304 and/or the reference architecture 302. The current state 310 can include information related to, or indicative of, the current configuration 308. In some implementations, the current configuration 308 can be part of the current state 310. The current state 310 can include information related to, or indicative of, a current operational state. The current operational state can include, for example, information or parameters indicative of which assets are down, processing performance of one or more assets, networking performance of one or more assets, percentage usage of resources for one or more assets, redundancies, disaster recovery, operational recovery, high availability, operational recovery or a combination thereof, among others. The current state 310 can include information related, or indicative of, a current security state. The current security state can include, for example, information or parameters indicative of current vulnerabilities for one or more assets, resiliency, current security risks at the asset level or the solution stack level, or a combination thereof, among others.

The CEM system 228 can obtain information indicative of, or associated with, the current state 310 from one or more data sources, such as vulnerability scanners, assets of the solution stack, subsystem or the computer environment 200, logs of the solution stack, subsystem or the computer environment 200, databases or online information resources (e.g., websites, webpages or client application pages) of vendors of the solution or assets thereof, or a combination thereof. For example, the CEM system 220 can profile, or cause another system or device to profile, one or more assets of the solution stack, the subsystem or of the computer environment 200. The CEM system 228 can compare and/or merge data received from a plurality of data sources. For example, the CEM system 228 can compare data received from various vulnerability scanners with respect to one or more parameters of the solution stack, the subsystem or an asset thereof. The CEM system 228 can profile, or cause the profiling of, one or more assets, for example, to resolve a conflict or inconsistency in data from various vulnerability scanner or other data sources.

The CEM system 228 can analyze information received from the data sources, e.g., a combination of asset communication activity information, communication or configuration logs, physical or logical interconnection data, Internet protocol (IP) addresses, processing power usage data, memory or storage usage data, network resources usage data, and/or power resources usage data, to deduce additional parameters of the current state 210. For example, the CEM system 228 can use communication activity information, communication logs, and/or security zone(s) for one or more assets of the solution stack or subsystem to deduce a parameter value indicative of whether or not the solution stack complies with a security specification (or requirement). According to another example, the CEM system 228 can use information indicative of current architecture and/or descriptions of one or more assets of the solution stack or subsystem to deduce a parameter value indicative of redundancy or of failure risk for the solution stack or subsystem.

The simulated state 312 can represent a state of a simulated scenario of the solution or the subsystem. The CEM system 228 can simulate, or cause simulation of, one or more hypothetical versions of the solution stack or subsystem, for example, in terms of the architecture, configuration or other aspects of the solution stack. The CEM system 228 can define or construct a modified or hypothetical version of the solution stack or subsystem that is, for example, different from the current state 310 of the solution stack or subsystem with respect to one or more aspects or features, and simulate the modified or hypothetical version of the solution stack or subsystem to assess effect of the difference(s) on various assets associated with the solution stack, subsystem or the computer environment 200. For example, if the current state 310 indicates a current problem, e.g., related to the current architecture, current configuration 308, or other aspects of the solution stack or subsystem, the CEM system 228 or a component thereof can simulate a plurality of modifications of the solution stack that can be pursued to fix the problem. The simulations can provide estimates of the effects of each of the possible solution modifications on the solution stack, the computer environment 200, or components thereof. The use of simulations can help avoid or mitigate potential chaotic modifications, and pursue a relatively smooth modification path or scenario. The CEM system 228 can generate a plurality of simulation responses associated with a plurality of potential modifications. Each potential modification to the solution stack can be simulated at one or more layers, e.g., the network layer, storage layer, virtualization layer, electrical layer, or application layer, among others. The CEM system 228 can provide the plurality of simulation responses for display to a user, and the user can select one of the potential modifications to be implemented based on the simulation responses. The CEM system 228 may recommend one of the potential modifications to be implemented based on the simulation responses.

The CEM system 228 can monitor a solution stack or subsystem of the computer ecosystem 200 to assess operational health, security health or other aspects of the solution, the subsystem or respective assets in real-time or near real-time (e.g., periodically every predefined time interval). The CEM system 228 may assess the operational health, security health or other aspects of the solution or subsystem responsive to an assessment request received, for example, from a user of the CEM system 228. The CEM system 228 can assess the solution stack in various domains, such as the service domain, the infrastructure domain, the security domain or a combination thereof, among others.

Figure 4:
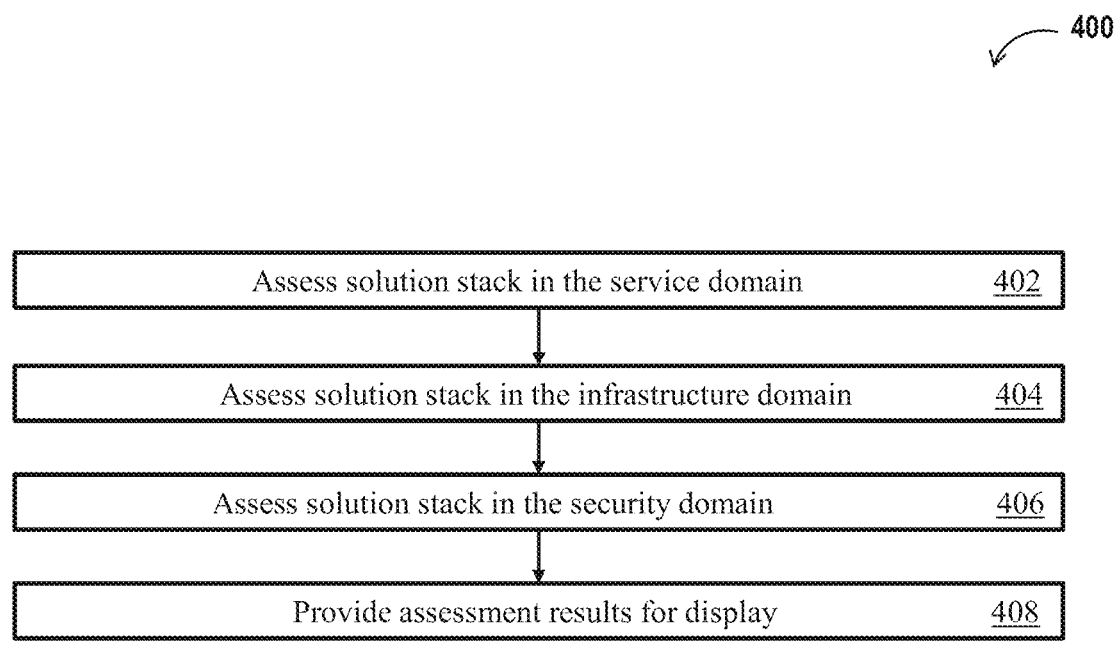
FIG. 4 shows a flowchart illustrating a method of monitoring deployed solution stacks or subsystems, according to example embodiments.

Referring to FIG. 4, a flowchart illustrating a method 400 of monitoring deployed solution stacks or subsystems of a computer ecosystem is shown, according to example embodiments of the current disclosure. The method 400 can include assessing a solution stack or subsystem in the service domain (STEP 402). The solution stack can be associated with a corresponding solution. The method 400 can include assessing the solution stack in the infrastructure domain (STEP 404). The method 800 can include assessing the solution stack in the security domain (STEP 406). The method 400 can include providing assessment results for display on a display device (STEP 408).

The method 400 can include the CEM system 228 (or a component thereof) assessing the solution stack or subsystem in the service domain (STEP 402). Assessing the solution stack or subsystem in the service domain can include the CEM system 228 checking for availability of one or more services provided by the solution or subsystem. For example, the CEM system 228 can run a script (or software code) to send a request for a given service (or to initiate a session) to the solution or subsystem. The CEM system 228 can check one or more solution responses, if any, to request sent. The solution or subsystem response(s) may include, for example, an acknowledgement of the request or an indication of initiation of the requested service on the part of the solution stack. The response(s) may include a failure or error message. The CEM system 228 can determine availability of the solution (or subsystem) or a service thereof based on, for example, the existence and/or content of responses to service requests. The CEM system 228 can check one or more assets of the solution stack or subsystem to determine whether a specific software (or application) associated with the requested service is executing thereon. The CEM system 228 can profile (e.g., send one or more requests for asset related information) the one or more assets of the solution stack or subsystem for software (or applications) running thereon and check whether the specific software (or application) is among the ones currently executing on the one or more assets. Checking for software (or applications) running on one or more assets of the solution (e.g., after sending the service request) can allow the CEM system 228 to assess whether or not the solution stack, subsystem or assets thereof are showing adequate response to the service request. In some implementations, the CEM system 228 can employ the asset profiling to diagnose the service(s) thereof at one or more granular levels. For instance, in case a service is down, the CEM system 228 can provide a detailed diagnosis of which asset(s) of the solution or subsystem is/are not available (or down).

As part of service domain assessment, the CEM system 228 can determine or estimate a performance metric indicative of, for example, a measure or ranking of the overall performance of the solution. The CEM system 228 can determine or estimate one or more performance metrics for one or more services provided by the solution. The CEM system 228 can determine the performance metric(s) for the solution and/or services thereof based on, for example, number or percentage of successful service requests (sent to the solution stack), the time duration the solution takes to respond to each request or to initiate each service, the number of successful parallel requests or a combination thereof, among others.

The method 800 can include the CEM system 228 (or a component thereof) assessing the solution stack or subsystem in the infrastructure domain (STEP 404). Assessing the solution stack or subsystem in the infrastructure domain can include the CEM system 228 checking for or determining various situational awareness attributes for various assets of the solution or subsystem. For instance, the CEM system 228 can profile one or more assets for central processing unit (CPU) usage, memory usage, network performance (e.g., transmission/reception rate, bandwidth usage, short-term packet loss, etc.), disk space, disk latency or a combination thereof, among others. The CEM system 228 can use weighted aggregations for various assets of the solution with respect to a (or each) situational awareness attribute to determine an overall performance of the solution (or a service thereof) with respect to that attribute. The infrastructure domain assessment can provide a performance assessment at the asset level.

The method 400 can include the CEM system 228 (or a component thereof) assessing the solution stack or subsystem in the security domain (STEP 406). Assessing the solution stack in the security domain can include the CEM system 228 assessing the security of the solution (or subsystem) and/or assets thereof. For instance, the CEM system 228 can check or verify security of one or more communication links, tunnels or communication transactions, data encryption, security configurations of one or more assets, security zones for various assets, vulnerabilities for various assets or a combination thereof, among others. The CEM system 228 can determine an assessment of overall security flaws for the solution, subsystem or services thereof based on these verifications.

The method 400 can include the CEM system 228 (or a component thereof) providing assessment results (or monitoring data) obtained, for example, at any of the steps 402-406 for display on a display device. The CEM system 228 can generate a visual representation of the solution stack or subsystem using the assessment data obtained during any of the steps 402-406. The visual representation may include a two-dimensional (2D) visual representation or a three-dimensional (3D) visual representation. The visual representation can be depict the architecture (e.g., assets, interconnections between assets, interdependencies between assets and/or type of each asset). The visual representation can depict the importance (or relative importance) of each asset with respect to one or more aspects of the assets. The visual representation can be an interactive representation. For instance, the visual representation can cause the display device to display additional information about an asset (e.g., asset type, asset name, asset description, IP address, asset location, configuration settings and/or operating system among others) upon interaction with a depiction (or representation) of the asset. The visual representation may be filtered, for example, to show only assets of a given type or assets satisfying some filtering criterion.

The CEM system 228 can provide various two-dimensional (2D) or three-dimensional (3D) representations of the current architecture of the solution for display on a display device. The 2D and/or 3D representations can illustrate filtered versions of the reconstructed current solution architecture. For example, the 2D and/or 3D representations can depict the current solution architecture per layer, per asset vendor, per geographical area or a combination thereof, among others.

Referring to FIGS. 5A-5D, various 2D visual representations 500A-500D illustrating various architectures associated with a SKYPE for Business solution within a given geographical location (e.g., Boston) are shown. In FIGS. 5A-5D, each square represents a corresponding asset. The lines connecting pairs of assets can represent connections between or interdependencies between the corresponding assts. The term "BOS" refers to the geolocation Boston, "CR" refers to core router, "ASW" refers to access switch, "USP" refers to un-interrupted power supply, which is an electrical apparatus that provides emergency power to a load when the input (or main) power source fails, "VS" refers to virtual server and "ST" refers to storage (or storage device).

Figure 5A:
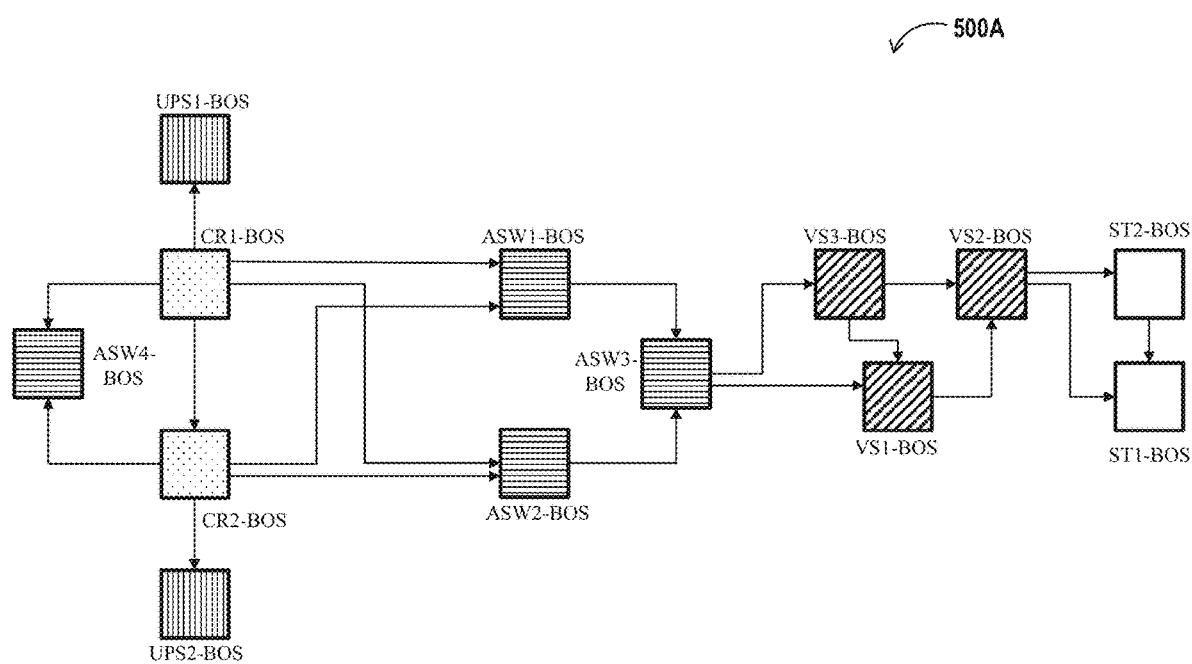
FIGS. 5A-5D show various 2D visual representations illustrating various architectures associated with a SKYPE for Business solution within a given geographical location.
Figure 5B:
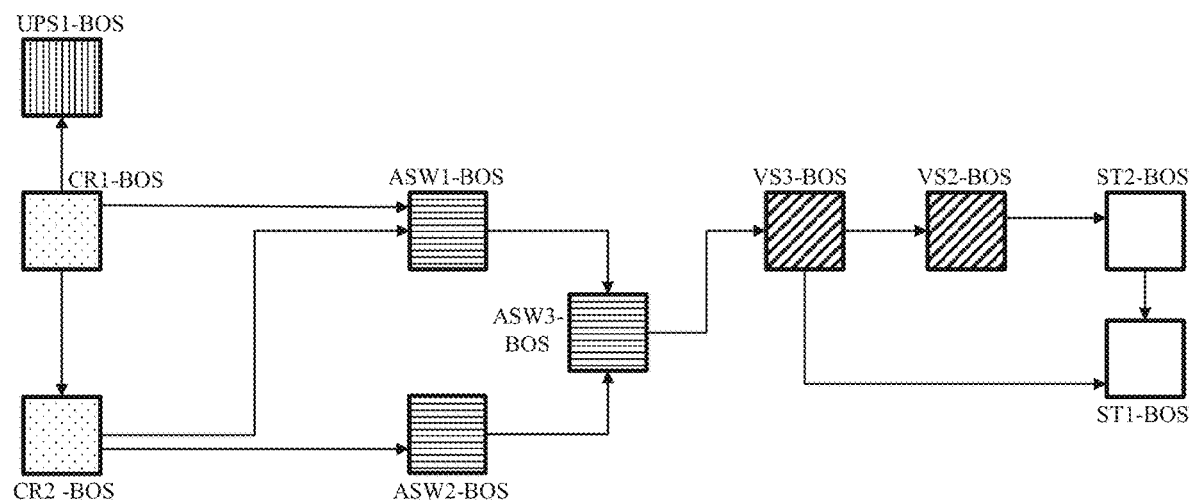
Figure 5C:
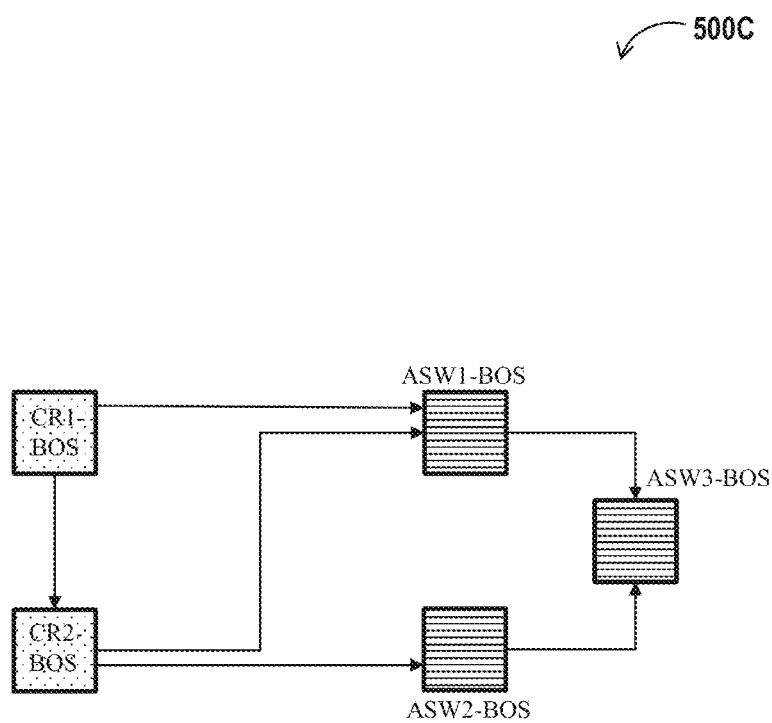
Figure 5D:
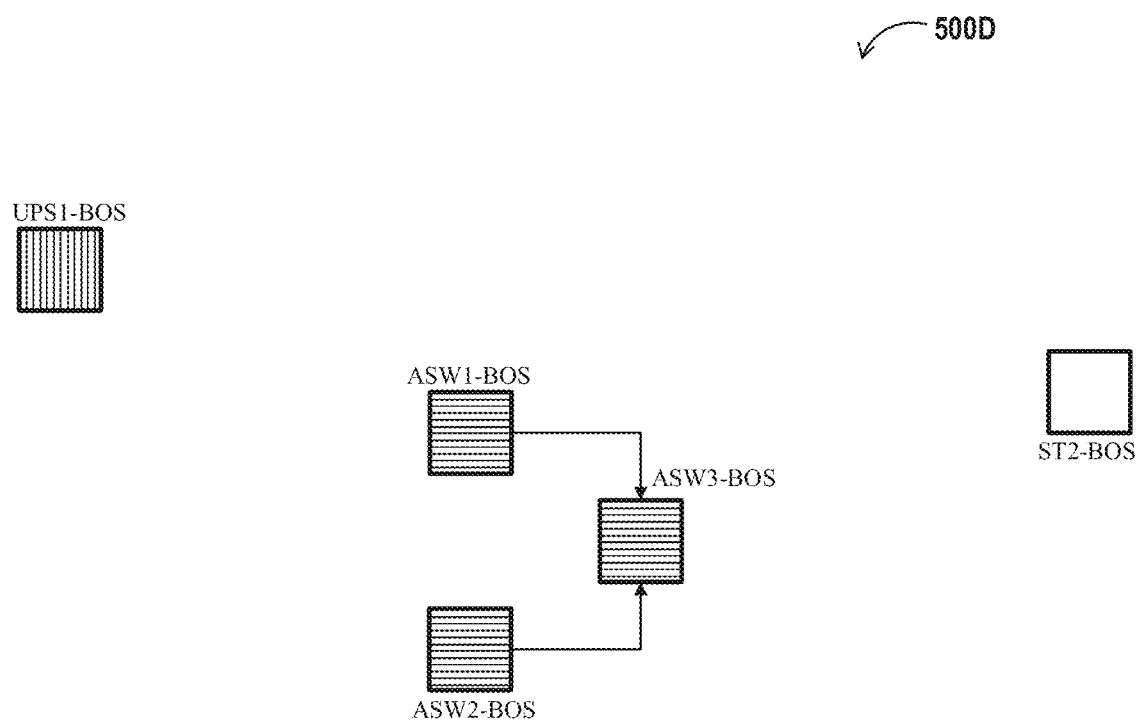

The 2D visual representation 500A in FIG. 5A represents the reference solution architecture, while the 2D visual representation 500B in FIG. 5B represents the current architecture of the solution as currently implemented. Comparing both architectures, one can see that the access switch "ASW4-BOS," the power supply "UPS2-BOS" and the virtual server "VS1-BOS" are present in the reference solution architecture 500A in FIG. 5A but not in the reconstructed current solution architecture 500B of FIG. 5B. As used herein, The 2Dvisual representation 500C in FIG. 5C depicts the current network layer architecture of the SKYPE for Business solution in the Boston area. In other words, the 2D representation 500C can be viewed as a filtered version (e.g., the network layer) of the current architecture of the SKYPE for Business solution in the Boston area shown in FIG. 5B. FIG. 5D shows another filter version of the current architecture of the SKYPE for Business solution in the Boston area shown in FIG. 5B. Specifically, the visual representation 500D shown in FIG. 5D depicts the subset of assets of the current architecture of the SKYPE for Business solution in the Boston area that are provided by a specific vendor (e.g., CISCO).

Referring to FIGS. 6A-6C, 3D visual representations 600A-600C of the architectures depicted in FIGS. 5B-5C of the SKYPE for Business solution in the Boston area are shown. Specifically, the 3D visual representation 600A corresponds to the 2D visual representation 500B and represents the current architecture of the SKYPE for Business solution in the Boston area. The 3D visual representations 600A-600C can be interactive allowing a user of the CEM system 228 (or a client device 102), for example, to rotate the displayed 3D representations and get different views of the architecture from different angles. As such, the user can identify single points of failure, especially where the displayed architecture is condensed (e.g., having a relatively large number of assets and/or a large number of interconnections). A single point of failure is a node (or asset) that connects two subsets of the solution assets with no other link connecting the two subsets of the solution assets. A single point of failure can be defined within one layer or across multiple layers.

Referring back to FIG. 4, the method 400 can include the CEM system 228 repeating steps 402-412 over time (e.g., periodically or regularly) for a given solution stack or subsystem of the computer ecosystem 200. The CEM system 228 may repeat the method 400 for other solutions stacks or subsystems of the computer ecosystem 200. Once the CEM system 228 constructs the current architectural and/or configuration state of a first solution, the CEM system 228 may do the same for a second solution. The CEM system 228 may generate the current architectural and/or configuration states for all, or a selected subset of, the solutions deployed in the computer environment/ecosystem 200. The CEM system 228 may generate the current architectural and/or configuration states for various deployed solutions sequentially or in parallel.

C. Generating and Rendering Dynamic 3D Representations of Subsystems of a Computer Ecosystem The CEM system 228 can generate a 3D visual representation illustrating an architecture or a current state of a solution stack, or a subsystem of a computer environment or ecosystem, and provide the 3D visual representation for display on a display device 124 (as shown in FIG. 1C). The display device 124 can be a display device of the CEM system 228, a display device of a client device 102 or a display device that is communicatively connected to the CEM system 228. While the CEM system 228 is described above mainly with respect to identification and monitoring of solution stacks or subsystems, in general, the CEM system 228 can monitor the whole computer environment 200, any subsystem or solution stack thereof, or any group of assets thereof, among others. For example, a subsystem or a group of assets of the computer environment 200 can correspond to assets of one of the geographical sites 202-206, one of the solution stacks 210, 212 and 214, an asset type (e.g., servers, network devices, storage devices, etc.), or a network layer, among others. The CEM system 228 can generate, and provide for rendering, 3D visual representations of architectures or current states of subsystems or groups of assets of the computer environment 200.

The 3D visual representation can be an interactive representation that can be rotated or interacted with in various ways on the display device 124. For instance, a user can hover over, click on or touch a depiction of an asset in the 3D visual representation to cause additional information about the asset to be displayed. The user can interact with the 3D visual representation, for example, to identify assets that are suffering some problems (e.g., under stress, misconfigured, breached, or non-compliant with some regulation(s), among others). However, searching for any problems by interacting with the 3D visual representation may be time consuming and cumbersome. For example, in a condensed 3D visual representation, the number of assets to be fetched can be large, and the corresponding data to be checked can enormous. In such a case, identifying any problems may take a long time and some problems may missed by the user.

In the current disclosure, intelligent approaches/techniques for generating and rendering dynamic 3D representations of solution stacks, subsystems or groups of assets of a computer ecosystem allow for emphasizing assets of relatively higher importance or that require immediate attention. Specifically, systems and methods described herein allow for constructing and rendering the 3D dynamic representations in way that relatively important assets are at the front of the 3D representation when displayed. The dynamic 3D representation can also include visual features to alert the user with respect to assets associated with relatively more severe problems, higher risk, or that require more urgent attention or fixing, among others.

Figure 7:
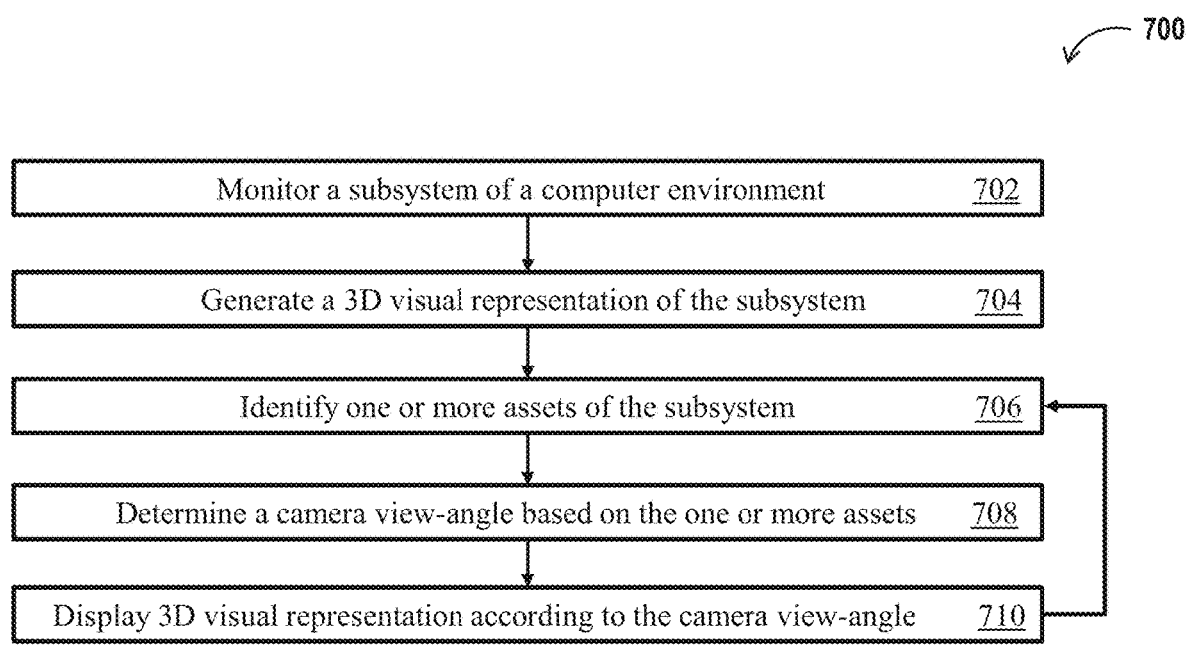
FIG. 7 shows a flowchart illustrating a method of generating and rendering a dynamic 3D visual representation of a subsystem of a computer environment, according to example embodiments.

Referring to FIG. 7, a flowchart illustrating a method 700 of generating and rendering, e.g., in real-time, a dynamic 3D visual representation of a subsystem of the computer environment 200 is shown, according to example embodiments. The method 700 can include monitoring operational and/or cybersecurity states of a subsystem of the computer environment 200 (STEP 702), and generating a 3D visual representation of a current state of the subsystem of the computer environment 200 (STEP 704). The method 900 can include identifying one or more assets of the subsystem (STEP 706), and determining a camera viewing-angle of the 3D visual representation based on the one or more identified assets of the subsystem (STEP 708). The method 900 can include rendering the 3D visual representation of the subsystem according to the determined camera viewing-angle (STEP 710). The method 700 can include repeating steps 706-710 upon obtaining updates of the current state of the subsystem.

The method 700 can include the CEM system 228 monitoring the subsystem of the computer environment 200 (STEP 702). The subsystem of the computer environment 200 can include the whole computer environment 200, solution stack 210, 212 or 214, a sub-solution thereof, a super solution, or a group of assets associated, for example, with site 202, 204 or 206 or with a type of asset, among others. For instance, the CEM system 228 can identify a solution stack for a sub-solution, a solution or super-solution and monitor the identified solution stack, e.g., as described with regard to FIG. 4. The CEM system 228 can identify the subsystem or a group of assets to be monitored responsive to a specific event. For example, the event can include the CEM system 228 becoming aware of a published vulnerability or detecting a cybersecurity hole associated with the computer environment 200. The event can include the CEM system 228 detecting or identifying an operational problem, such an indication that and asset or a subsystem being under stress or not responsive. The event can include the CEM system 228 detecting an infrastructure or configuration discrepancy, for example, with respect to a reference architecture or reference architecture. In some implementations, a user can define, e.g., via a UI, the subsystem or assets thereof to be monitored by the CEM system 228.

As discussed above with respect to FIG. 4, in monitoring the subsystem of the computer environment 200, the CEM system 228 can assess the subsystem or parameters thereof in the service domain, the infrastructure domain, the security domain, or a combination thereof, among others. The CEM system 228 can monitor the subsystem of the computer environment 200 on a continuous basis, or iteratively, for at least a given time period. The CEM system 228 can automatically initiate the monitoring of the subsystem, for example, responsive to a detected event. The monitoring of the subsystem can be triggered by a user, such as an IT administrator of the computer environment 200. In monitoring the subsystem of the computer environment 200, the CEM system 228 can employ vulnerability scanners to scan the subsystem or assets thereof, or can directly profile one or more assets of the subsystem to obtain real time data indicative of configuration, connectivity, operational health or cybersecurity health, among others, of the assets of the subsystem. The CEM system 228 can initially perform a full scan of the subsystem at the start of the monitoring process, and then iteratively check and update dynamic parameters of the subsystem associated with the service domain, the infrastructure domain, the security domain, or a combination thereof, among others. The CEM system 228 can check and update distinct parameters at different frequencies depending, for example, on the rate of change of each parameter.

The method 700 can include the CEM system 228 generating a 3D visual representation of a current state of the subsystem of the computer environment 200 (STEP 704). The CEM system can generate the 3D visual representation using obtained monitoring data, such as physical and/or logical connectivity between the assets of the subsystem, configuration parameters of the assets, security data, resources usage data, performance assessment data at the asset level, or a combination thereof, among others. The 3D visual representation can be indicative of a current state of the subsystem. The current state can be a current comprehensive state indicative of various aspects of the subsystem, such as operational health, cybersecurity health, physical architecture, logical architecture, and/or configuration, or a current specific state indicative of a single or few aspects of the subsystem.

Figure 6A:
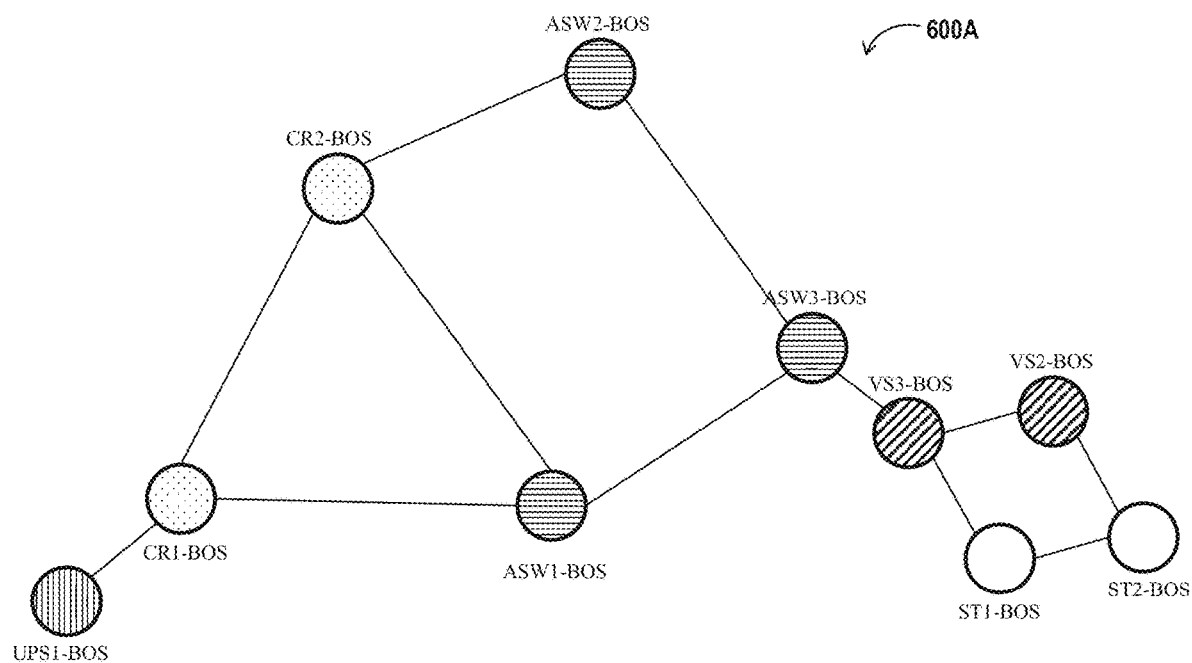
FIGS. 6A-6C show 3D visual representations of the architectures depicted in FIGS. 5B-5C of the SKYPE for Business solution.
Figure 6B:
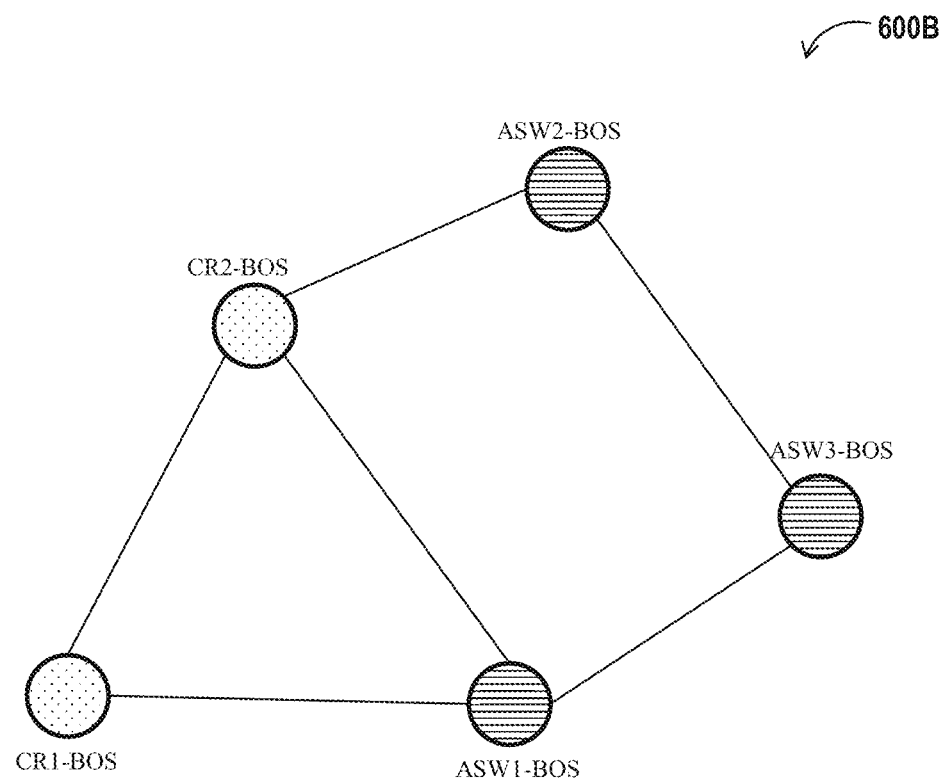
Figure 6C:
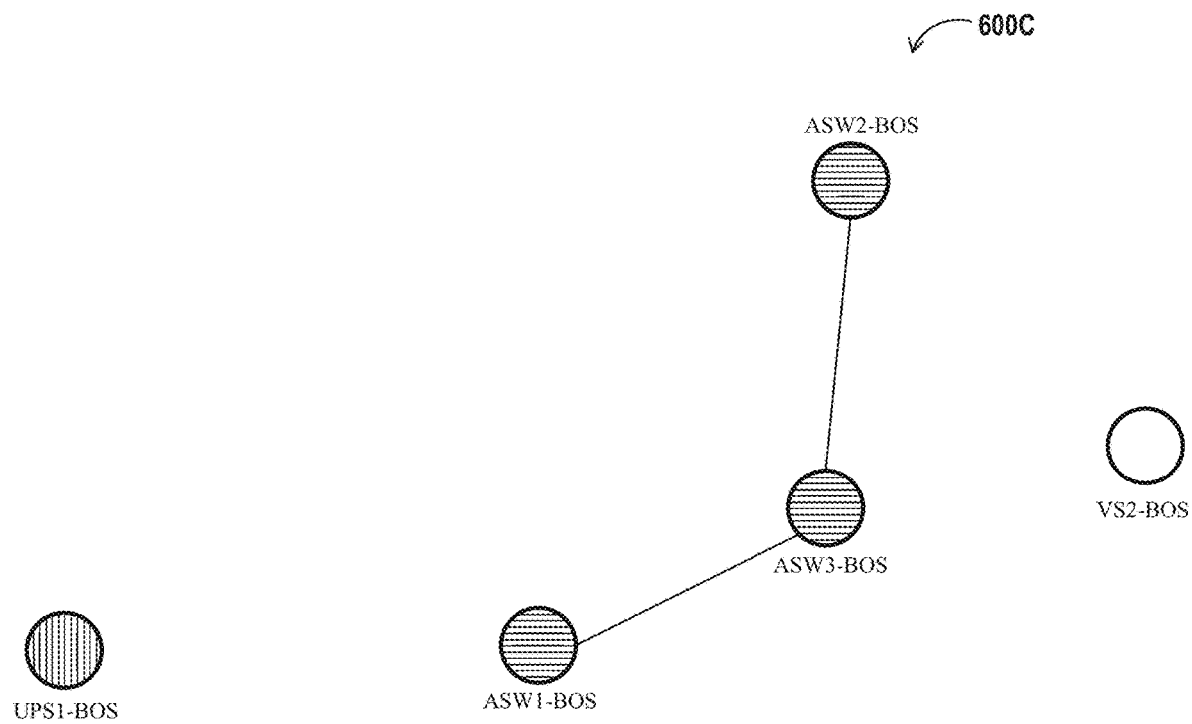

As illustrated in FIGS. 6A-6C, the visual representation can be in the form of a network of nodes where each node represents a corresponding asset of the subsystem. The shape, size, color and/or other visual characteristic of each node can be indicative of a corresponding characteristic of the asset represented by the node, such as the asset type, a rank or score of the asset, or a solution or site to which the asset belongs, among others. The CEM system 228 can assign to each asset the corresponding importance parameter (e.g., rank or score) using the monitoring data. For example, the importance parameter of the asset can be indicative of a security state, such as whether or not the state is affected with a given vulnerability, security hole and/or security threat, or number of unpatched vulnerabilities affecting the asset, security violations by the asset, or a combination thereof, among others. The importance parameter of the asset can be indicative of an operational or performance state, such as whether or not the asset is available and responding, a stress level of the asset, a processing responsiveness speed of the asset, a failure rate of the asset, or a combination thereof, among others. The importance parameter of the asset can be indicative of misconfiguration(s) of the asset, non-compliance of the asset with one or more regulations, or a combination thereof, among others. In some examples, the importance parameter of the asset can be indicative of a combination of security aspects, operational or performance aspects, configuration aspects, and/or compliance aspects of the asset. For instance, the importance parameter can be indicative of a stress level of the asset, a risk score of the asset, a priority to resolve a problem associated with the asset, a cost of the asset being down or a combination thereof, among others.

The links in the network of nodes can be indicative of physical communication links, logical communication links, dependencies, or other relationships between each pair of nodes connected to each other via a corresponding link. The thickness, length, color, type (e.g., dashed line, break line or continuous line), shape (e.g., curved or straight), and/or other visual characteristic of each link can be indicative of a corresponding characteristic of the relationship represented by the link between the pair of nodes connected by the link. Such characteristics can include, for example, a strength of the relationship (e.g., dependency) between the pair of nodes, a type of communication link between the pair of nodes, or a performance metric of the communication link (e.g., data rate or packet loss rate) between the pair of nodes, among others.

The network of nodes can include a separate node for each asset of the subsystem, or nodes corresponding to a subset of the assets of the subsystem. For example, as discussed above with regard to FIGS. 5A-5D and 6A-6C, the subset of the assets of the subsystem represented by the 3D visual representation (or the network of nodes) can be associated with a given geographical location, a specific vendor, a specific asset type or a specific layer, among others. Also, the CEM system 228 can generate the 3D visual representation of the subsystem to include hidden information that is revealed upon the user interacting with the 3D visual representation. For example, upon the user interacting with (e.g., clicking, hovering over or touching) a node or a link, additional information or metadata associated with that node or link can be displayed.

In some implementations, the CEM system 228 can generate the network of nodes such that a hypothetical mesh of the nodes forms a 3D convex hull or surface. For example, the nodes can be arranged in the 3D space to form, e.g., based on a hypothetical mesh, an ellipse, an ellipsoid, a regular polytope (e.g., a tetrahedron, an octahedron, a dodecahedron or an icosahedron), or a portion thereof, among others. Generating the network of nodes to form a hypothetical 3D convex hull or surface allows for providing views of the network of nodes where each view puts focus on a corresponding subset of the nodes. For example, when one of such views is displayed, the corresponding subset of nodes will appear closer than other nodes to the virtual camera used to generate the view (or to a user viewing the rendered view on a display device). In some implementations, the CEM system 228 can position the nodes of the 3D visual representation in 3D space using force-directed algorithms.

The method 700 can include the CEM system 228 identifying one or more assets of interest among the subsets of the subsystem (STEP 706). The one or more assets can be of interest to the user (e.g., an IT administrator) for whom the 3D visual representation is to be displayed. For instance, the one or more assets can be assets that are affected by an ongoing event, or that call for immediate attention of the user. The one or more assets can be associated with, for example, a cybersecurity threat, hole or breach, an unpatched vulnerability, a cybersecurity or compliance violation, a relatively high stress level, one or more misconfigurations, a specific vendor, a given asset type, or a combination thereof, among others. The CEM system 228 can identify the one or more assets of interest using importance parameters of various assets. For example, the CEM system 228 can identify the one or more assets of interest as the asset(s) having the greatest (or lowest) n importance parameters, where n is an integer smaller than the total number of assets represented by the 3D visual representation. The CEM system 228 can identify the one or more assets of interest by checking data or parameters (e.g., CPU usage, rate of transmitted or received data packets, rate of packet loss, responsiveness or availability, configuration parameters, or a combination thereof, among others) obtained as part of the monitoring step of STEP 702.

In some implementations, the CEM system 228 can identify the one or more assets of interest and then generate the 3D visual representation (or the network of nodes). The CEM system can take into account the identified one or more assets when generating the 3D visual representation. For example, the CEM system 228 can arrange at least the nodes corresponding to the one or more identified assets on a hypothetical 3D convex surface.

The method 700 can include the CEM system 228, or a computing device, determining a camera view-angle of the 3D visual representation based on the one or more identified assets of the interest (STEP 708). In some implementations, the CEM system 228 can send the generated 3D visual representation and an indication of the one or more identified assets to the computing device for display of the 3D visual representation. In such implementations, the computing device can determine the camera view-angle of the 3D visual representation based on the one or more identified assets of the interest. In some other implementations, the CEM system 228 can determine the camera view-angle of the 3D visual representation, and send the 3D visual representation and an indication of the determined camera view-angle to the computing device. The computing device can include, for example, a client device or a display device of the computer environment. For example, the computing device can be a client device 102 or include a desktop, laptop, or portable device of an IT administrator of the computer environment, or smart display device for displaying data received from the CEM system 228.

The CEM system 228, or the computing device, can determine the camera view-angle such that when a view of the 3D visual representation captured from the determined camera view-angle is displayed, the one or more identified assets show up in the front of the view (or appear closer than other nodes to the virtual camera or the viewer). In other words, the identified assets would have relatively small visual depths in the 3D visual representation compared to other assets. The visual depth of each asset can represent the distance between the asset and the virtual camera. The CEM system 228, or the computing device, can determine the camera view-angle based on the relative positioning of the nodes corresponding to the identified assets with respect to each other and/or the relative positioning of the nodes corresponding to the identified assets with respect to other nodes of the 3D visual representations. Determining the camera view-angle can be viewed as a determination of a view of the 3D visual representation (or the network of nodes). For example, the CEM system 228 or the computing device can determine the camera view-angle such that the virtual camera is facing a hypothetical convex surface associated with the node(s) corresponding to the identified asset(s), and that each of the rest of the nodes appear to be arranged farther from the virtual camera than any of the node(s) corresponding to the identified asset(s). In some implementations, the CEM system 228 or the computing device can determine the camera view-angle with the constraint that none of the nodes is hidden, either fully or partially, behind another node. The CEM system 228 can modify the length or relative orientation of one or more links of the node of networks to avoid visual overlap of nodes in the view corresponding to the camera view-angle.

The method 700 can include the computing device rendering the 3D visual representation of the subsystem according to the determined camera view-angle (STEP 710). The computing device can display the view of the 3D visual representation corresponding to the determined camera view-angle. Automatically providing a view of the 3D visual representation that puts visual focus on the identified assets of interest allows for an automatic visual alerting system. Specifically, depending on the complexity of the 3D visual representation, e.g., in terms of the number of respective nodes and/or the number of respective links, it may not be apparent to the user of the computing device which assets are undergoing or facing cybersecurity or operational problems or deficiencies, for example, if the displayed view of the 3D visual representation is properly selected. Directing the user's visual attention, through selection of the camera-view angle, to the asset(s) determined to be affected with, or to be the source of, a given deficiency or threat allows for (i) faster and more meaningful intervention by the user, and (ii) more efficient use of the user's time. Also, especially in urgent situations which call for immediate intervention by the user, it is undesirable to keep the user in the dark with respect to, for example, the source of the problem, the affected assets, or the relatively high important assets to be considered first in terms of fixing an ongoing problem, among others.

While the CEM system 228 and/or the computing device automatically provide a view of the 3D visual representation that puts focus on one or more assets of interest, the rendered 3D visual representation or a UI in which the 3D visual representation can allow for user interaction to change the displayed view (or the camera viewing angle). Specifically, the rendered 3D visual representation or the UI can allow the user to change an orientation of the displayed 3D visual representation, for example, through swipe or click-and-drag actions.

The method 700 can include repeating steps 706-710 upon obtaining updates of the current state of the subsystem. Specifically, the monitoring process of STEP 702 can be ongoing and/or repetitive for at least some time period during which the current state of the subsystem may change over time. For example, during an ongoing cybersecurity attack, the number of affected assets may change (e.g., increase) over time. Also, the stress level of various assets may vary over time depending on, for example, the processes executed by each asset at any point of time, the dynamic and time varying assignment of virtual machines to virtual hosts, and/or the effect of any intervening events, among others. These example scenarios, among other ones, can lead to a change in the subset of assets of interest. In particular, the CEM system 228, at any point of time, can identify a new subset of assets of interest based on new or updated monitoring data at STEP 702. If the new subset of assets of interest is different from previously identified asset(s) of interest, the change can call for a new or different view of the 3D visual representation of the subsystem to be rendered on the computing device in order to put visual focus on the new identified subset of assets of interest rather than the previously identified subset.

In some implementations, the CEM system 228 can generate a new 3D visual representation (or a new network of nodes) based on the newly identified subset of assets of interest, as discussed above with regard to steps 704 and 706. In such implementations, the CEM system 228 can send an update of the 3D visual representation or the new network of nodes to the computing device. The CEM system 228 or the computing device can determine a new camera view-angle based on the new identified subset of assets of interest in a similar way as discussed above with regard to STEP 708. The CEM system 228 can send an indication of the new identified subset of assets of interest to the computing device, which can determine the new camera viewing-angle based on the new identified subset of assets of interest. In some implementations, the CEM system 228 can determine the new camera view-angle and send an indication of the new camera view-angle or the corresponding view to the computing device.

The computing device can use the new camera view-angle to display the corresponding view of the 3D visual representation. As such, the computing device can automatically update or change the rendered view of 3D visual representation such that at any point of time the automatically rendered view puts focus on the latest identified subset of assets of interest. This approach can keep pointing the user's visual focus on the latest identified subset of assets of interest, and therefore, visually illustrating changes in priorities in terms of what the user should be looking at.

Figure 8:
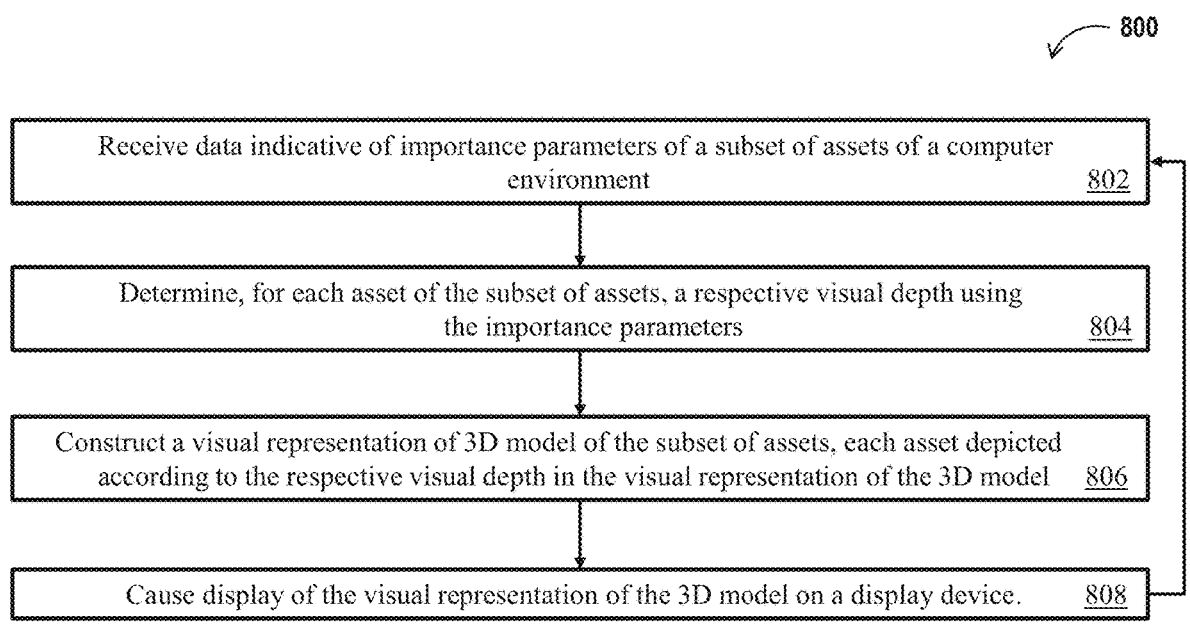
FIG. 8 shows a flowchart illustrating another method of generating and rendering a dynamic 3D visual representation of a subsystem of the computer environment, according to example embodiments.

Referring to FIG. 8, a flowchart illustrating another method 800 of generating and rendering, e.g., in real-time, a dynamic 3D visual representation of a subsystem of the computer environment 200 is shown, according to example embodiments. The method 800 can include receiving data indicative of importance parameters of a subset of assets of a computer environment 200 (STEP 802), and determining, for each asset of the subset of assets, a respective visual depth using the importance parameters (STEP 804). The method 800 can include constructing (or generating) a visual representation of a 3D model of the subset of assets where each asset is depicted according to the respective visual depth in the visual representation of the 3D model (STEP 706). The method 800 can include causing display of the visual representation of the 3D model on a display device (STEP 808).

The method 800 can include the CEM system 228, or a computing device (e.g., client 102) communicatively coupled to the CEM system 228, receiving data indicative of importance parameters of a subset of assets of a computer environment 200 (STEP 802). The subset of assets can be associated with a subsystem of the computer environment 200. The subsystem of the computer environment 200 can include the whole computer environment 200, solution stack 210, 212 or 214, a sub-solution thereof, a super solution, or a group of assets associated, for example, with site 202, 204 or 206 or with a type of asset, among others. The CEM system 228 can monitor the subsystem (e.g., as discussed above with regard to STEP 702 of FIG. 7), and receive monitoring data of the subset of assets. The computer environment/ecosystem 200 can include a plurality of assets, among which the subset of assets.

The received data can include cybersecurity health data (e.g., vulnerability data or firewall data), compliance data, asset configuration data, connectivity data, network data, operational health data (e.g., stress levels, resources' usage data or responsiveness speed, among others) and or risk data, among others. For instance, the received data can be related to the service domain, the infrastructure domain, the security domain, or a combination thereof, among others. The received data can be indicative of a current state of each asset of the subset of assets. For each asset, the respective current asset can be indicative of an importance level of the asset that can be expressed via a corresponding importance parameter.

The CEM system 228 or the computing device can determine, for each asset, the corresponding/respective importance parameter using the received monitoring data. For each asset, the respective importance parameter can be indicative of the stress level (e.g., processing and/or communication stress level) of the asset, the security state of the asset, an operational health state of the asset, the compliance state of the asset, the risk level or score of (or associated with) asset, a priority to resolve a problem associated with the asset, a cost of the asset being down, a compliance state of the asset, a configuration state of the asset, or a combination thereof, among others. The importance parameter can be a rank or a score of the asset. The CEM system 228 can determine, for each asset, the respective importance parameter using one or more asset monitoring parameters, a weighted sum of various monitoring parameters or predefined formulation or function of various monitoring parameters, among others.

In some implementations, the CEM system 228 or the computing device can receive monitoring data for a plurality of assets (e.g., larger than the subset of assets) of the computer environment 200, and compute for each asset of the plurality of assets a respective importance parameter. The CEM system 228 or the computing device can identify the subset of assets by filtering the plurality of assets using the respective importance parameters. For instance, the CEM system 228 or the computing device can use an importance threshold value to identify the subset of assets of the computer environment 200. The CEM system 228 or the computing device can filter the plurality of assets by excluding assets with respective importance parameters smaller than (or greater than) the importance threshold value. For example, if the importance parameters represent ranks of the assets, the CEM system 228 or the computing device can exclude assets with ranks greater than a threshold rank, and identify the subset of assets as the assets having ranks smaller than or equal to the threshold rank. If the importance parameters represent scores that increase with increase importance, the CEM system 228 or the computing device can exclude assets with scores smaller than a threshold score, and identify the subset of assets as the assets having importance scores greater than or equal to the threshold importance score.

The method 800 can include the CEM system 228 or the computing device determining, for each asset of the subset of assets, a respective visual depth using the importance parameters (STEP 804). The CEM system 228 or the computing device can assign to each asset of the subset of assets a corresponding visual depth according to which the asset is to be rendered. The higher is the importance (e.g., the higher is the importance score or the lower is importance rank) of the asset, the smaller is the visual depth of the asset. The CEM system 228 or the computing device can determine the visual depth of each asset with respect to a virtual camera and a camera view angle of the virtual camera. The visual depth of each asset can represent the distance between the asset and the virtual camera along the camera view angle.

The visual depth of each asset may be proportional to the respective importance parameter. In some implementations, the visual depth of each asset may be inversely proportional to the respective importance parameter. In general, if the importance parameters represent importance scores that increase with increased asset performance, the CEM system 228 or the computing device may assign to the subset of assets visual depths that decrease with increasing importance parameters of the assets. The higher the importance score, the smaller is the visual depth of the asset and the closer is the asset to a viewer when displayed on the display device. If the importance parameters represent importance ranks of the assets that decrease with increasing asset performance, the CEM system 228 or the computing device may assign to the subset of assets visual depths that decrease with decreasing importance ranks of the assets. The smaller is the importance rank, the smaller is the visual depth of the asset and the closer is the asset to a viewer when displayed on the display device.

The method 800 can include the CEM system 228 or the computing device constructing a visual representation of the 3D model of the subset of assets, such that each asset is depicted according to the respective visual depth in the visual representation of the 3D model (STEP 806). The CEM system 228 or the computing device can generate a 3D model of the subset of assets where the subset of assets are arranged in the 3D space according to the respective visual depths that represent corresponding distances from the virtual camera along the camera view angle. The CEM system 228 or the computing device can generate (or define) the 3D visual representation of the subset of assets as the generated 3D model when viewed by the virtual camera along the camera view angle. In other words, the 3D visual representation of the subset of assets can be defined as the generated 3D model of the subset of assets, the location of the virtual camera and the camera view angle.

The 3D visual representation of the subset of assets can include metadata associated with each asset. The metadata for each asset can be configured to be displayed responsive to an interaction with the corresponding asset. For instance, the CEM system 228 or the computing device can incorporate computer executable instructions as part of the 3D visual representation. The computer executable instructions, when executed by a processor, can cause the processor to display asset metadata upon interaction with a depiction of the asset in the 3D visual representation, or cause changing the virtual camera or the camera view angle, upon rotation of the 3D model on a display device.

The method 800 can include the CEM system 228 or the computing device causing display of the visual representation of the 3D model on a display device (STEP 808). The CEM system 228 can send the 3D visual representation to the computing device or a display device. The computing device or the display device can display the 3D model according to the location of the virtual camera and the camera view angle. In some implementations, the computing device or the display device can include an application for displaying 3D models (or 3D objects). The CEM system 228 can provide a user interface and a 3D rendering application to the computing device or the display device, for displaying the 3D visual representation.

Figure 9A:
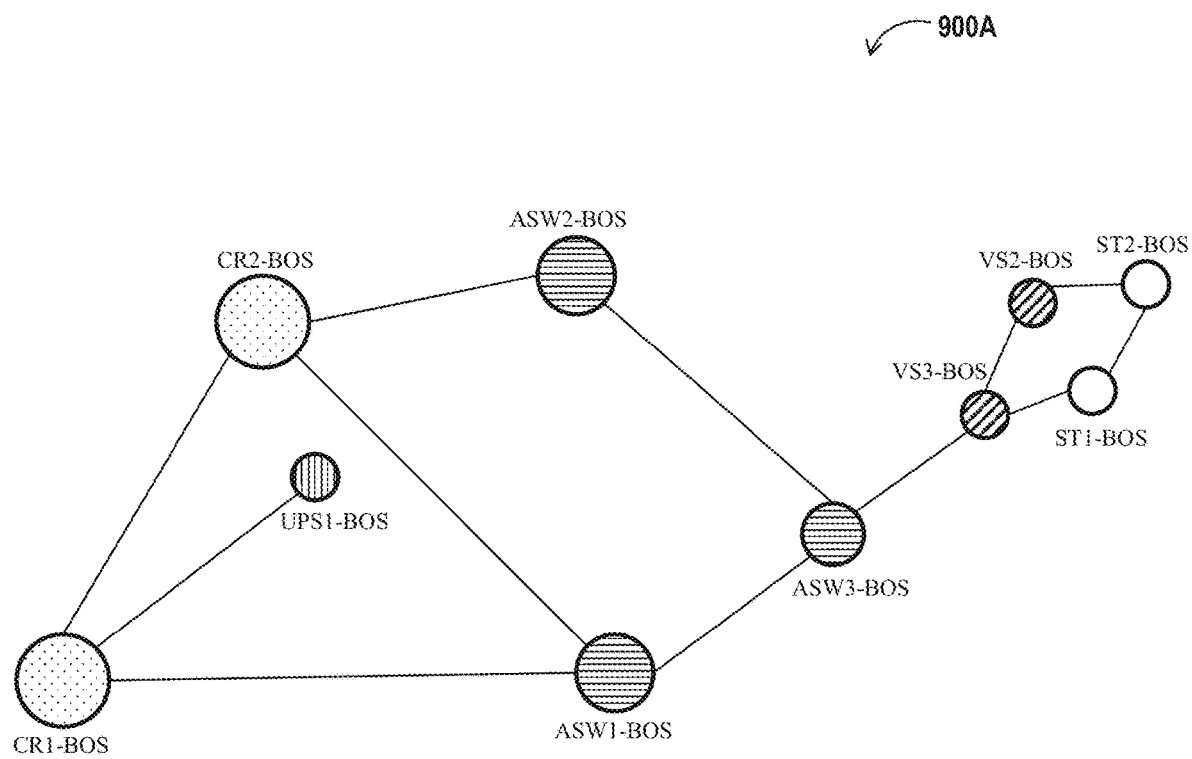
FIGS. 9A and 9B show two 3D visual representations of the current architecture of the SKYPE for Business solution constructed according to example embodiments of the method of FIG. 8.
Figure 9B:
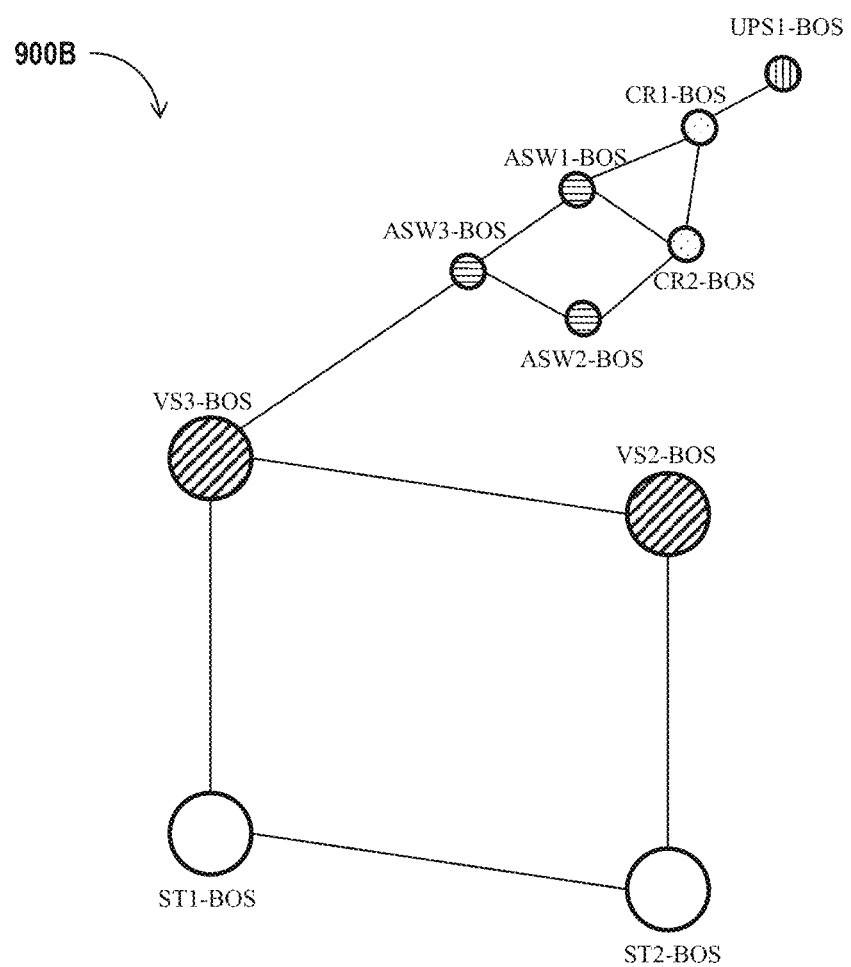

Referring to FIGS. 9A and 9B, two 3D visual representations 900A and 900B of the SKYPE for Business solution in the Boston area constructed according to the method 800 of FIG. 8, are shown. Both 3D visual representations 900A and 900B correspond to the 3D representation 600A of FIG. 6A. In other words, the 3D visual representations 900A and 900B are visual representations of the current architecture (or current state) of the SKYPE for Business solution in the Boston area shown in FIGS. 6A and 5B. In the 3D visual representation 900A, the assets CR1-BOS, CR2-BOS, AWS1-BOS, AWS2-BOS and AWS3-BOS have relatively high importance and are rendered with relatively small visual depths. The assets VS2-BOS, VS3-BOS, ST1-BOS, ST2-BOS and UPS1-BOS have relatively low importance and are rendered with relatively large visual depths. In the 3D visual representation 900B, the assets VS2-BOS, VS3-BOS, ST1-BOS and ST2-BOS have relatively high importance and are rendered with relatively small visual depths. The assets CR1-BOS, CR2-BOS, AWS1-BOS, AWS2-BOS, AWS3-BOS and UPS1-BOS have relatively low importance and are rendered with relatively large visual depths.

Referring to FIGS. 10A-10F, various 3D visual representations 1000A-1000F of a subset (or cluster) of assets are shown, according to example embodiments. The subset of assets includes six assets named A-F. The 3D visual representation 1000A is generated without optimization of the visual depths of the assets based on asset parameters. In the 3D visual representation 1000B, the visual depths of the assets are defined/optimized to reflect the CPU usage of each asset. The higher the CPU usage of an asset, the smaller is the visual depth of the asset. The 3D visual representation 1000C shows the assets A-F with the respective visual depths defined/optimized to reflect the CPU usage of each asset (similar FIG. 10B). The 3D visual representation 1000C also shows an alert indicative of assets with a relatively high risk of crashing or going down. The risk of crashing is indicated via a fill-pattern of the node(s) corresponding to assets with relatively high crashing/failure risk. In some implementations, alerts of high risk of crashing/failure can be indicated via a predefined color for the nodes.

Figures 10D, 10E, 10F:
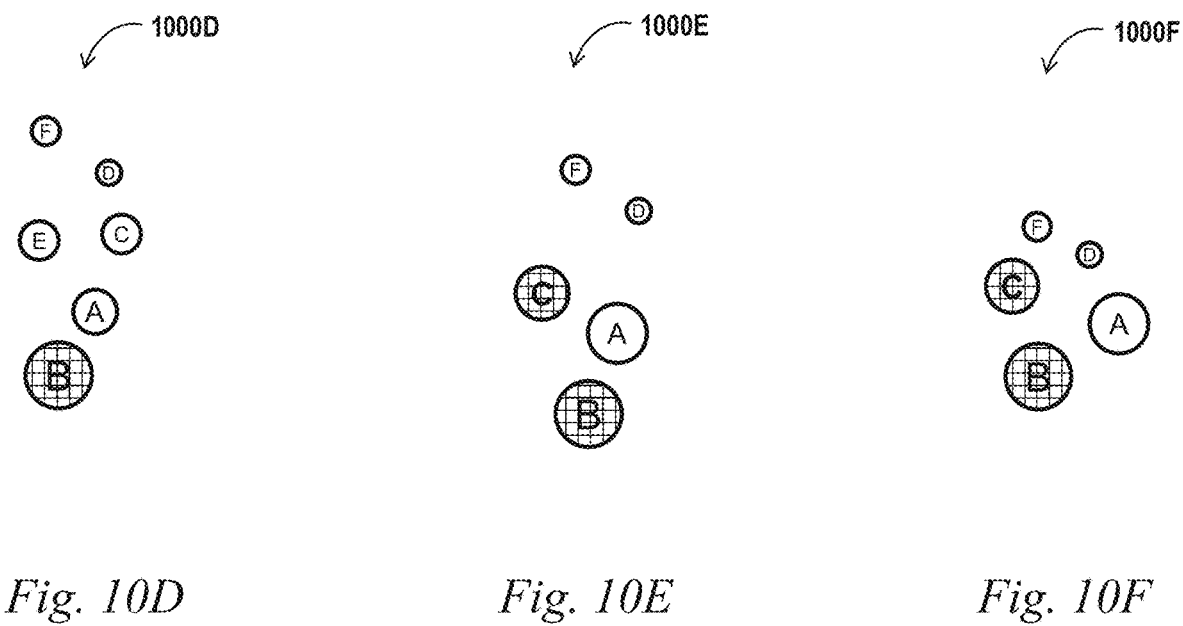

In FIG. 10D, the 3D visual representation 1000D shows the assets A-F with the respective visual depths defined/optimized to reflect the risk of crashing/failure for each asset (similar FIG. 10B). The alert in the 3D visual representation 1000D is also indicative of high risk of crashing or failure. The risk of crashing/failure is illustrated via a fill-pattern of the node(s) corresponding to assets with relatively high crashing/failure risk. In FIGS. 10A-10D, the full cluster of assets, e.g., assets A-F, is included in the visual representations 1000A-1000D.

The 3D visual representations 1000E and 1000F are also constructed with asset depths reflecting the risk of crashing or failure, and alerts (e.g., fill-in pattern) pointing to assets with relatively high risk of crashing/failure. However, both representations 1000E and 1000F include a filtered version of the cluster of assets. Specifically, the asset E is filtered out or excluded. The filtering can be based on a geolocation, an asset type, an asset vendor, or other criteria. When constructing the 3D visual representation 1000E, the full cluster of assets A-F is used to determine the visual depths. The asset E is, however, filtered out from the 3D visual representation after computing the asset depths. When constructing the 3D visual representation 1000F, the asset E is excluded and not used to determine the visual depths. The 3D visual representation 1000F is generated according the visual depths computed using the assets A-D and F.

Referring back to FIG. 8, the constructed 3D visual representation can be an interactive can display additional information of the asset, such as asset name, asset type, asset operating system, asset IP address, asset security zone, asset description and/or asset configuration settings, among others. The 3D visual representation can be rotated or filtered based on user interaction or user input. For example, the CEM system 228 or the computing device can receive instructions to filter the 3D model of the subset of assets. The filtering can be based on a geolocation, an asset type, an asset vendor, or other criteria. The CEM system 228 or the computing device can reconstruct, responsive to the instructions, a second visual representation of a filtered version of the 3D model. Each asset in the filtered version of the 3D model can be depicted according to the respective visual depth in the second visual representation. The CEM system 228 or the computing device can cause display of the second visual representation on the display device.

The method 800 can include the CEM system 228 or the computing device repeating steps 802-808 each time new monitoring data of the computer environment or the subsystem of the computer environment is received. For instance, the CEM system 228 can monitor a solution stack or subsystem continuously or periodically, a update asset assessment/monitoring data in real time. Each time new monitoring data is received, the CEM system 228 can repeat steps 802-808 of method 800. As such, the 3D visual representations displayed reflect changes in the current states of the assets in real time.

Each method described in this disclosure can be carried out by computer code instructions stored on computer-readable medium. The computer code instructions, when executed by one or more processors of a computing device, can cause the computing device to perform that method.

While the disclosure has been particularly shown and described with reference to specific embodiments, it should be understood by those skilled in the art that various changes in form and detail may be made therein without departing from the spirit and scope of the invention described in this disclosure.

While this disclosure contains many specific embodiment details, these should not be construed as limitations on the scope of any inventions or of what may be claimed, but rather as descriptions of features specific to particular embodiments of particular inventions. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

What is claimed is:

1. A system comprising:
one or more processors and a memory configured to cause the system to:
 (a) receive data indicative of importance parameters of a subset of assets of a plurality of assets of a computer environment, each asset of the subset of assets associated with a respective importance parameter;
 (b) determine, for each asset of the subset of assets, a respective visual depth using the respective importance parameter of the asset, the respective visual depth representing a distance between the asset and a virtual camera along a camera view angle;
 (c) construct a visual representation of a three-dimensional (3D) model of the subset of assets, each asset of the subset of assets depicted according to the respective visual depth in the visual representation of the 3D model, and the respective visual depth of the asset indicative of the relative importance of the asset compared to other assets in the subset of assets such that the more important is the asset the smaller is the respective visual depth; and
 (d) cause display of the visual representation of the 3D model on a display device.

2. The system of claim 1, wherein the data indicative of the importance parameters of the subset of assets is received responsive to real time monitoring of the computer environment or a subsystem of the computer environment, and wherein the one or more processors and the memory are configured to:
repeat steps (a)-(d) each time new monitoring data of the computer environment or the subsystem of the computer environment is received.

3. The system of claim 1, wherein in determining, for each asset of the subset of assets, the respective visual depth, the one or more processors and the memory are configured to:
assign respective visual depths to the subset of assets that decrease with increasing respective importance parameters, or
assign respective visual depths to the subset of assets that increase with increasing respective importance parameters.

4. The system of claim 1, wherein the one or more processors and the memory are configured to:
receive data indicative of respective importance parameters for the plurality of assets of the computer environment; and identify the subset of assets by filtering the plurality of assets using the respective importance parameters for the plurality of assets and an importance threshold value.

5. The system of claim 1, wherein the respective importance parameter for each of the subset of assets represents a stress level of the asset.

6. The system of claim 1, wherein the respective importance parameter for each of the subset of assets represents a risk score of the asset.

7. The system of claim 1, wherein the respective importance parameter for each of the subset of assets represents a priority to resolve a problem associated with the asset.

8. The system of claim 1, wherein the respective importance parameter for each of the subset of assets represents a cost of the asset being down.

9. The system of claim 1, wherein the one or more processors and the memory are configured to, upon interaction with a depiction of an asset in the visual representation, cause display of information about the asset.

10. The system of claim 1, wherein the one or more processors and the memory are configured to:
receive instructions to filter the 3D model of the subset of assets;
reconstruct, responsive to the instructions, a second visual representation of a filtered version of the 3D model, each asset in the filtered version of the 3D model depicted according to the respective visual depth in the second visual representation; and
cause display of the second visual representation on the display device.

11. A method comprising:
(a) receiving, by a computing device, data indicative of importance parameters of a subset of assets of a plurality of assets of a computer environment, each asset of the subset of assets associated with a respective importance parameter;
(b) determining, by the computing device, for each asset of the subset of assets, a respective visual depth using the respective importance parameter of the asset, the respective visual depth representing a distance between the asset and a virtual camera along a camera view angle;
(c) constructing, by the computing device, a visual representation of a three-dimensional (3D) model of the subset of assets, each asset of the subset of assets depicted according to the respective visual depth in the visual representation of the 3D model, and the respective visual depth of the asset indicative of the relative importance of the asset compared to other assets in the subset of assets such that the more important is the asset the smaller is the respective visual depth; and
(d) causing, by the computing device, display of the visual representation of the 3D model on a display device.

12. The method of claim 11, wherein the data of the subset of assets is received responsive to real time monitoring of the computer environment or a subsystem of the computer environment, the method comprising:
repeating steps (a)-(d) each time new monitoring data of the computer environment or the subsystem of the computer environment is received.

13. The system of claim 11, wherein determining, for each asset of the subset of assets, the respective visual depth, includes:
assigning respective visual depths to the subset of assets that decrease with increasing respective importance parameters, or
assigning respective visual depths to the subset of assets that increase with increasing respective importance parameters.

14. The method of claim 11, comprising:
receiving, by the computing device, data indicative of respective importance parameters for the plurality of assets of the computer environment; and
identifying, by the computing device, the subset of assets by filtering the plurality of assets using the respective importance parameters for the plurality of assets and an importance threshold value.

15. The method of claim 11, wherein the respective importance parameter for each of the subset of assets represents a stress level of the asset.

16. The method of claim 11, wherein the respective importance parameter for each of the subset of assets represents a risk score of the asset.

17. The method of claim 11, wherein the respective importance parameter for each of the subset of assets represents a priority to resolve a problem associated with the asset.

18. The method of claim 11, wherein the respective importance parameter for each of the subset of assets represents a cost of the asset being down.

19. The method of claim 11, further comprising:
causing display of information of an asset upon interaction, on the display device, with a depiction of the asset in the visual representation.

20. A non-transitory computer-readable medium with computer code instructions stored thereon, the computer code instructions when executed by one or more processors cause the one or more processors to:
(a) receive data indicative of importance parameters of a subset of assets of a plurality of assets of a computer environment, each asset of the subset of assets associated with a respective importance parameter;
(b) determine, for each asset of the subset of assets, a respective visual depth using the respective importance parameter of the asset, the respective visual depth representing a distance between the asset and a virtual camera along a camera view angle;
(c) construct a visual representation of a three-dimensional (3D) model of the subset of assets, each asset of the subset of assets depicted according to the respective visual depth in the visual representation of the 3D model, and the respective visual depth of the asset indicative of the relative importance of the asset compared to other assets in the subset of assets such that the more important is the asset the smaller is the respective visual depth; and
(d) cause display of the visual representation of the 3D model on a display device.

* * * * *